US008263694B1

(12) United States Patent
Warren et al.

(10) Patent No.: US 8,263,694 B1
(45) Date of Patent: Sep. 11, 2012

(54) POLYURETHANE-CONTAINING GROUTS

(75) Inventors: Christopher Warren, Columbus, MD (US); John A. Simms, Wilmington, DE (US)

(73) Assignee: Starquartz Industries, Inc., Baltimore, MD (US)

( * ) Notice: Subject to any disclaimer, the term of this patent is extended or adjusted under 35 U.S.C. 154(b) by 788 days.

(21) Appl. No.: 12/098,946

(22) Filed: Apr. 7, 2008

(51) Int. Cl.
*C08K 3/22* (2006.01)
*C08L 75/04* (2006.01)

(52) U.S. Cl. ........ 524/432; 524/433; 524/436; 524/590; 524/591

(58) Field of Classification Search ................ 52/742.16; 524/432, 433, 436, 590, 591
See application file for complete search history.

(56) References Cited

U.S. PATENT DOCUMENTS

| | | | |
|---|---|---|---|
| 3,372,083 A | 3/1968 | Evans et al. | |
| 3,386,944 A | 6/1968 | Blomeyer et al. | |
| 3,706,696 A * | 12/1972 | Bernett et al. | 524/388 |
| 3,854,267 A * | 12/1974 | Weiant et al. | 52/742.16 |
| 3,915,917 A * | 10/1975 | Weiant et al. | 524/430 |
| 3,967,429 A * | 7/1976 | Weiant et al. | 52/742.16 |
| 3,993,798 A | 11/1976 | Brose et al. | |
| 4,059,551 A * | 11/1977 | Weiant et al. | 523/402 |
| 4,080,353 A | 3/1978 | Monte et al. | |
| 4,152,311 A | 5/1979 | Monte et al. | |
| 4,261,913 A | 4/1981 | Monte et al. | |
| 4,296,207 A | 10/1981 | Siegmund | |
| 5,104,664 A * | 4/1992 | Palmere et al. | 424/660 |
| 5,116,901 A * | 5/1992 | Biale | 524/457 |
| 5,284,169 A * | 2/1994 | Gilligan et al. | 132/321 |
| 5,362,322 A | 11/1994 | Johansen, Jr. et al. | |
| 5,430,094 A | 7/1995 | Gola et al. | |
| 5,536,775 A | 7/1996 | Curatolo et al. | |
| 5,569,696 A | 10/1996 | Abramson et al. | |
| 5,663,267 A | 9/1997 | Frost | |
| 5,678,165 A | 10/1997 | Wu | |
| 5,968,257 A | 10/1999 | Ahrens | |
| 6,255,382 B1 * | 7/2001 | Hamada et al. | 524/591 |
| 6,264,737 B1 | 7/2001 | Liotta, Jr. et al. | |
| 6,375,736 B1 | 4/2002 | Lovelace | |
| 6,387,504 B1 | 5/2002 | Mushovic | |
| 6,783,799 B1 | 8/2004 | Goodson | |
| 7,005,462 B2 | 2/2006 | Schad et al. | |
| 7,183,338 B1 | 2/2007 | Warren | |
| 7,393,583 B1 | 7/2008 | Warren | |
| 2005/0148726 A1 | 7/2005 | Coggio et al. | |
| 2005/0153068 A1 * | 7/2005 | Li et al. | 427/180 |

FOREIGN PATENT DOCUMENTS

| | | |
|---|---|---|
| DE | 102005013767 A1 * | 9/2006 |
| JP | 2000327908 A * | 11/2000 |
| WO | WO 2004/031094 | 4/2004 |
| WO | WO 2005/118732 | 12/2005 |

OTHER PUBLICATIONS

Machine translation of JP 2000-327908 A, Nov. 28, 2000.*
Machine translation of DE 10 2005 013 767 A1, Sep. 28, 2006.*
Reichhold, Inc., Research Triangle Park, North Carolina. Reichhold Product Brochures. Date: Copyright 2006 and 2007.
Alberdingk Boley, Inc., Greensboro, North Carolina. U915 Material Safety Data Sheet. Date: Jun. 23, 2006.
Alberdingk Boley, Inc., Greensboro, North Carolina. 2008-2009 Alberdingk USA Brochure. Date: Mar. 2008.
Alberdingk Boley GmbH, Krefeld, Germany. U911 Material Safety Data Sheet. Date: Mar. 16, 2006. (German-language).
Alberdingk Boley GmbH, Krefeld, Germany. Alberdingk U911 Polyurethane-Dispersion. 2 pages. Date: Jun. 18, 1999. (German-language).
Alberdingk Boley USA. <www.alberdingkusa.com>, web page. Date: Copyright: 2007-2008.
Fox Industries, Inc., Baltimore, Maryland. FX-I Jet Set Brochure. Date: Sep. 2005.
Fox Industries, Inc., Baltimore, Maryland. FX-I Jet Set Material Safety Data Sheet. Date: Feb. 2008.
Fox Industries, Inc., Baltimore, Maryland. FX-III Jet Set Accelerator Brochure. Date: Jan. 2002.
Fox Industries, Inc., Baltimore, Maryland. FX-Jet Set Accelerator Material Safety Data Sheet. Date: May 2000.
Fox Industries, Inc., Baltimore, Maryland. FX-XXX Jet Set Gel Brochure. Date: Jan. 2005.
Fox Industries, Inc., Baltimore, Maryland. FX-XXX Jet Set Gel Material Safety Data Sheet. Date: May 2000.
Fox Industries, Inc., Baltimore, Maryland. FX-V Jet Set Flex LV Brochure. Date: Jan. 2005.
Fox Industries, Inc., Baltimore, Maryland. FX-V Jet Set Material Safety Data Sheet. Date: May 2000.
Fox Industries, Inc., Baltimore, Maryland. FX-III Jet Set Hydrophilic Sealing and Grouting Compound Brochure. Date: Jan. 2005.
Fox Industries, Inc., Baltimore, Maryland. FX-XXX Jet Set Reinforcing Agent Brochure. Date: Jan. 2002.
Fox Industries, Inc., Baltimore Maryland. FX-III Jet Set Material Safety Data Sheet. Date: Jul. 1993.
Fox Industries, Inc., Baltimore, Maryland. <www.foxind.com>. "FX-III Jet Set Stablizes Soil and Waterproofs Perimeter of the Steiff Building, a Baltimore Landmark." 2 pages. Date: Undated.
Fox Industries, Inc., Baltimore, Maryland. <www.foxind.com>. "FX-III Jet Set Utilized to Seal Leaks in Blue Mountain Tunnel." 2 pages. Date: Undated.
Fox Industries, Inc., Baltimore, Maryland. <www.foxind.com>. "FX-III Jet Set is Utilized to Achieve Soil Stabilization in P S E & G Sub-Stations at Newport, Hudson, North Ave, and Hoboken." 1 page. Date: Undated.
Fox Industries, Inc., Baltimore, Maryland. <www.foxind.com>. "Fox products utilized to seal water leaks in electrical conduits Public Service Electric & Gas Co." 1 page. Date: Undated.
Fox Industries, Inc., Baltimore, Maryland. <www.foxind.com>. Product Information page. 1 page. Date: Copyright 2006.
Swamberg. David J. et al. "Water-Reducible Polyurethane Enamels: Candidate Low VOC Aerospace Topcoat Formulations." Boeing Defense & Space Group, Seattle, Washington. Date: Undated.

(Continued)

*Primary Examiner* — Vickey Nerangis
(74) *Attorney, Agent, or Firm* — Jansson Shupe & Munger Ltd.

(57) ABSTRACT

Grout compositions having a binder including water-borne polyurethane and a filler are described herein. An accelerator component is provided to control the rate of grout curing, thereby decreasing the time required between grout application and grout use. This result is achieved while providing sufficient time for grout application. Grout may be light-transmissive and include light-transmissive binder and filler.

33 Claims, 4 Drawing Sheets

OTHER PUBLICATIONS

Martin Marietta Magnesia Specialties, LLC, Baltimore, Maryland. MagChem 200-AD Specialty Grade Magnesium Oxide Data Sheet. Date: Copyright 2003.

Wacker Chemical Corp., Adrian, Michigan. Silres BS 1001A, Silicone Water Repellent. 3 pages. Date: Jan. 2006.

Horsehead Corporation, Monaca, Pennsylvania. Zinvisible Zinc Oxide Data Sheet. Date: Feb. 2007.

Shand, Mark A. "The Chemistry and Technology of Magnesia." John Wiley & Sons. pp. 184-185. Date: 2006.

Hatada, Koichi et al. "Macromolecular Design of Polymeric Materials." Marcel Dekker, Inc., New York. pp. 551-552. Date: 1997.

* cited by examiner

POLYURETHANE-CONTAINING GROUTS

FIELD

The field relates to grout and, more particularly, grout with polyurethane-containing binder systems.

BACKGROUND

Grouts including water-borne polyurethane binder systems have been developed for the purpose of joining objects, such as tile and masonry, and for filling joints and voids between tiles and masonry. Such grout may be used to join tile to floors, walls, and ceilings and to fill the joints between such tiles so as to join the tiles into a continuous surface. U.S. Pat. No. 7,183,338 (Warren) describes grouts including water-borne polyurethane binder systems and grout products including water-borne polyurethane binder systems are commercially available from Starquartz Industries, Inc. of Baltimore, Md. under the QUARTZ-LOCK® brand.

Grouts including water-borne polyurethane binder systems have many excellent physical properties. Such grouts are strong, durable, and flexible. Grouts are capable of withstanding applied forces and movement of the surface to which the grout is applied, without breaking or cracking. Grouts including water-borne polyurethane binder systems are resistant to staining, both from contaminants and from cleaning solutions and solvents.

While grouts including water-borne polyurethane binder systems are excellent grouts, improvements are possible. For example, in certain grout applications it is desirable to decrease the amount of time required for the grout to harden sufficiently to enable use of the surface to which the grout is applied. Put another way, there is a need in certain grout applications to increase the rate at which the grout cures so that the surface to which the grout is applied can be put into use. Use of the surface would include, for example, the ability of the surface to accommodate foot or vehicular traffic without grout damage or discoloration, or the ability of the grout to be in contact with water or moisture, for example in an exterior application (e.g., an exterior patio or pool deck) or in an interior or exterior high-humidity application (e.g., a shower).

By way of example, it is desirable for a grout product including a water-borne polyurethane binder system to have a compressive strength of about 90 to about 1500 pounds per square inch (psi) before any use of the surface to which the grout is applied. By way of further example, such a grout would be considered essentially fully cured after having developed a compressive strength of about 4000 to about 5000 psi. In certain applications, as many as 48 hours may be required for a grout product including a water-borne polyurethane binder system to develop a compressive strength of about 1500 psi while 21 days may be required for such a grout to develop a compressive strength of about 4000 to about 5000 psi. It would be desirable in certain grout applications to reduce the time required before the grout can be used while at the same time providing adequate time within which to apply the grout.

It would also be desirable to provide grout including other useful properties, such as grouts permitting passage of light therethrough creating, for example, the effect of an appearance similar or the same as the color of the surrounding tile, masonry or other adjacent material. And, it would be desirable to provide a grout which can be formulated to provide improved flexibility, stain resistance and other desirable properties. Acceleration of the rate of grout curing may or may not be desirable in such light-transmissive and other grout formulations and applications.

SUMMARY

Grout comprising water-borne polyurethane binder, filler and accelerator for controlling grout hardening are described herein. In embodiments, the water-borne polyurethane binder and filler are admixed to provide a grout component to which the accelerator is added as a separate component prior to grout application. Representative accelerators are divalent or trivalent metal oxides and hydroxides. Highly preferred materials for use as accelerators comprise magnesium hydroxide, magnesium oxide, zinc oxide or any combination thereof. Preferably, accelerator is in an amount sufficient to provide an accelerator surface area of about 1 to about 60 square meters per 100 grams of the grout component. Accelerators are useful to reduce the time required for grout to form a hard surface yet provide adequate time for grout application.

In other embodiments, grout comprises light-transmissive grout which may optionally be used with accelerator. Preferred light-transmissive grout embodiments comprise a light-transmissive binder comprising water-borne polyurethane and light-transmissive filler admixed with the binder. Preferred light-transmissive fillers may include glass beads, acrylic beads, polypropylene beads, polyethylene beads, polystyrene beads, urethane beads, polycarbonate beads or any combination thereof.

Various additional constituents such as additional binder components, cross-linking constituents, silicone-containing emulsions, thickeners, tints/colors, and accents may be included to provide desired performance benefits.

DETAILED DESCRIPTION

Figure 1:
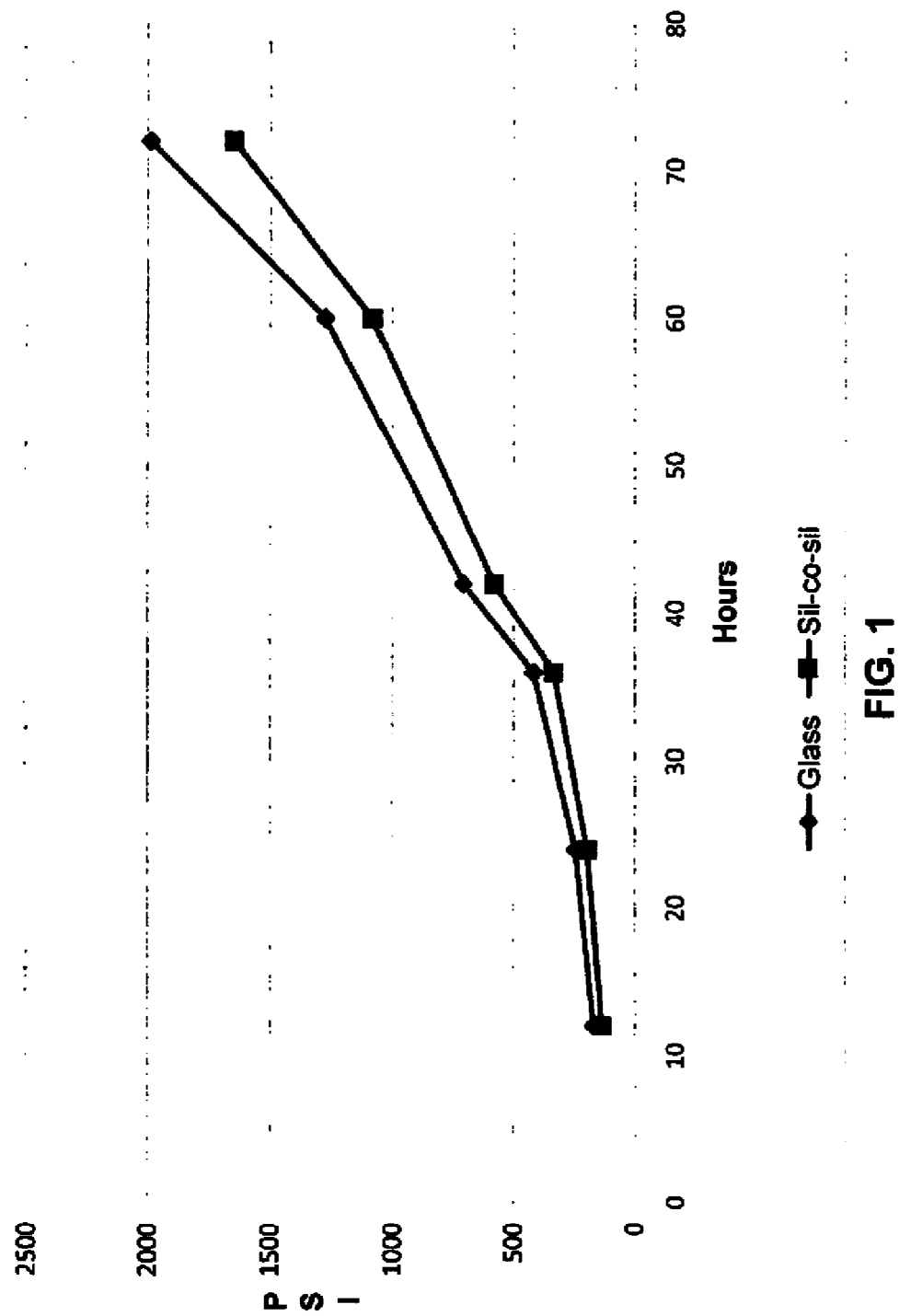
FIG. 1 is a graph illustrating that grout including glass bead filler forms high compressive strengths relatively faster than grout including silica flour filler, as a function of time.

Preferred embodiments of grout with binder systems which include water-borne polyurethane and one or more fillers are described herein. Grout may be formulated with a broad range of binders, fillers, and other constituents to provide grout products with properties desired by the formulator and end user.

Grout of the types described herein represents a mortar-type material which may be applied into various narrow cavities, such as masonry or tile joints. And, grout may be applied onto surfaces, such as floors, walls and ceilings, to fill or coat them and consolidate adjoining objects into a solid mass. By way of example only, grout may be applied to a floor or wall surface to hold one or more tile in place thereon and may be used to fill joints between such tiles. Grout, as described herein, may be used in virtually any application in which a conventional grout product could be used.

In embodiments, a control component is provided for admixture with the grout to provide a controlled rate of grout curing. The control component is referred to herein as an "accelerator" because such component can be formulated to control the rate of grout curing such that the applied grout forms a hardened material capable of use within a time period which is less than that possible with grout not including the control component. "Control" as used herein, simply means an improvement in rate of grout curing versus the unmodified grout. The amount of control desired may be determined by the grout formulator.

In other embodiments, an accelerator component is not required and is optional. In certain of these embodiments, one or more fillers are provided to permit passage or light through the grout. Light-transmissive-type grouts permit passage of light through the grout to provide a type of translucency which enables the grout to actually enhance or complement the appearance of adjacent materials, such as glass or ceramic tiles. This unique translucency characteristic permits a design professional to create beautiful and aesthetic designs in tile and other materials. The amount of light-transmissivity or opaqueness can be determined by the formulator by selection, for example, of an appropriate filler or fillers.

In general, grout compositions include a grout component and, optionally, an accelerator, or control component. The grout component comprises water-borne polyurethane and filler. Various water-borne polyurethanes may be incorporated into the grout component provided alone, as blends, or in combination with additives such as acrylics, modified acrylics, or epoxies, thereby providing formulation flexibility.

Fillers are utilized in the grout component to provide bulk and other performance characteristics to the finished grout composition applied to the work surface. Fillers comprising a combination of coarse and fine filler constituents may be provided. For example, a representative filler may comprise a combination of quartz and silica particles. In other embodiments, a more narrow range of filler particle sizes may be utilized. In yet other embodiments, fillers comprising light-transmissive materials, such as glass or polycarbonate in the form of fine particles and/or beads may be utilized. The amount of filler or fillers used and type of filler or fillers used may be selected and modified to provide the desired grout consistency and performance properties of interest to the end user.

The water-borne polyurethane, filler or fillers, and any optional constituents are admixed and are preferably supplied as a component separate from the accelerator component if accelerator is provided. The accelerator component is admixed with the grout component before grout use to provide the desired controlled rate of grout curing. Other optional constituents, such as for mold and algae control, stain resistance, and may be selected to provide desired grout performance properties.

DEFINITIONS

"A/an" means one or more.

"About" means approximately or nearly and in the context of a numerical value or range set forth herein means ±10% of the numerical value or range recited or claimed.

"Accelerator" means or refers to a component or components provided to cause applied grout to form a hardened material capable of use within a time period which is less than that possible for a grout not including the accelerator.

"Admix" means to mix or blend.

"Cure" means or refers to development of physical properties by evaporation of water and/or volatile content of the grout and/or the chemical reactions resulting in formation of a hardened, usable grout.

"Filler" means or refers to a material added to augment weight, or size, or fill space or modify the visual appearance provided by the grout.

"Glass beads" means or refers to spherical, or generally spherical, light-transmissive particles including glass oxides.

"Grout" means or refers to a relatively thin, coarse mortar worked or poured into various narrow cavities, such as masonry or tile joints, or applied onto surfaces, such as floors, walls and ceiling, to fill or coat them and consolidate adjoining objects into a solid mass. By way of example only, grout may be applied to a floor or wall surface to hold one or more tiles in place thereon and may be used to fill joints between such tiles.

"Kit" means or refers to a set or collection of supplies, for the purpose of formulating a grout with a controlled curing rate.

"Light transmissive" or "light transmissivity" means or refers to the capability to permit passage of light therethrough. Grout embodiments as described herein may be formulated with binder, filler and other constituents which permit passage of light therethrough.

"Polyol" means or refers to an alcohol with multiple hydroxy groups.

"PUD" means or refers to water-borne aliphatic anionic polyurethane dispersions. A PUD may be modified to include additional constituents to provide desired performance properties.

"Quartz" means or refers to a mineral containing silicon dioxide ($SiO_2$).

"TAA" means or refers to time available for grout application. TAA refers to the time within which grout compositions remain workable for application.

"TSH" means or refers to time to grout surface hardness. TSH is the time within which grout compositions form a surface hardness which is resistant to indentation.

"Translucent" means or refers to allowing light to pass through, but causing diffusion.

"Transparent" means or refers to allowing light to pass through with little or no resistance or diffusion.

"Water-borne polyurethane" means or refers to water-borne aliphatic anionic polyurethane dispersions. Water-borne polyurethane is also referred to herein as a PUD. Water-borne polyurethane comprises high molecular weight polyurethane solids dispersed primarily in water. Other constituents, such as volatile solvents, may be included in the dispersion. A polyurethane-containing solid is formed by water or solvent evaporation. Water-borne polyurethane may be formulated to include plural polyurethane types and/or additives, such as acrylics or epoxies.

Exemplary grout components for use in grout compositions as described herein are formulated to include a water-borne polyurethane binder. The water-borne polyurethane is a binder in that it contributes to coherence of the grout constituents, aiding in formulation of a defined grout mass. Water-borne polyurethanes should include a substantial anionic component to facilitate reaction with the accelerator as discussed herein. In embodiments, the binder including water-borne polyurethane is light-transmissive, permitting the passage of light therethrough. Use of a light-transmissive binder is particularly advantageous for applications in which the grout is intended to be light-transmissive.

In embodiments, water-borne polyurethane represents about 13 to about 25 weight percent of the grout component used to formulate the finished grout product. More preferably, water-borne polyurethane comprises about 14 to about 18 weight percent of the grout component. Water-borne polyurethanes typically have a polyurethane solids content which can range from about 20 to about 70 percent polyurethane solids, with a solids content of about 33 to about 66 weight percent solids being a more preferred range.

In general, polyurethanes of the type present in water-borne polyurethanes are produced by a poly addition reaction of a polyisocyanate with a polyalcohol (polyol) in the presence of a catalyst and other additives. A polyisocyanate refers to a molecule with two or more isocyanate functional groups, $(R-(N=C=O)_x$ where x is greater than or equal to 2) while a polyol refers to a molecule with two or more hydroxyl functional groups $(R'-(OH)_y$ where y is greater than or equal to 2). The reaction product is a polymer containing the urethane linkage, —RNHCOOR'—. The polymerization reaction is catalyzed by tertiary amines, such as dimethyl-cyclohexylamine, and organometallic compounds, such as dibutyltin dilaurate or bismuth octanoate.

The continuous phase in a water-borne polyurethane is at least about 30 weight percent, and, more often, is greater than about 75 weight percent water, and is thus characterized as aqueous. The balance of the continuous phase can be water, but frequently is a solvent such as 1-methyl-2-pyrrolidinone (NMP) CAS No. 872-50-4. Other solvents, such as methyl ethyl ketone can be used to reduce viscosity during dispersion synthesis, but are usually removed by distillation as a final step in dispersion preparation.

Water-borne polyurethanes capable of use in grout embodiments may be characterized as "aliphatic" in that aliphatic diisocyanates are preferably used in synthesis of the water-borne polyurethane dispersion. Aliphatic-based water-borne polyurethanes are particularly useful for applications in which contact between the grout and ultraviolet (UV) radiation is expected because aliphatic-based water-borne polyurethanes are resistant to discoloration from UV radiation. And, aliphatic-based water-borne polyurethanes have superior moisture-resistance properties.

Aliphatic diisocyanates are compounds in which the isocyanate groups are not attached directly to an aromatic group. The following aliphatic diisocyanates compounds are representative: isophorone diisocyanate (IPDI) (5-isocyanato-1-(isocyanatomethyl)-1,3,3-trimethyl-cyclohexane) CAS No. 4-98-71-9, bis-cyclohexylmethane 4,4' diisocyanate ($H_{12}$MDI) CAS No. 5124-30-1, hexamethylene diisocyanate (HDI) (1,6-diisocyanatohexane) CAS No. 822-06-0, trimethyl hexamethylene diisocyanate (TMHDI) CAS No. 28679-16-5, and meta tetramethyl xylylene diisocyanate (m-TMXDI) CAS No. 2778-42-9. For cost consideration reasons, $IPD_1$, $H_{12}$MDI and HDI are most frequently used in polyurethane synthesis. When utilized, the IPDI concentration in the dispersed polymer varies inversely with the extensibility and hardness of the films obtained from the dispersion.

The dispersed aliphatic diisocyanates polymers are ionomers. The aliphatic diisocyanates polymers are ionomers because they include ionic (i.e., charged) groups. These internal salt groups are either negatively or positively charged. Negatively charged (i.e. anionic) polymers are most preferably used with grouts as described herein because such anionic groups are believed to interact with the positively charged groups on the accelerator particles added to the grout at the time of use as described in detail below.

Dispersed urethane polymers with carboxyl groups are preferred; such polymers are found in the largest group of commercially-available urethane dispersions. In the water-borne polyurethane dispersion, the acid groups are partly or completely neutralized with triethyl amine or less often with dimethyl ethanolamine. 2,2-Dimethylolpropionic acid (DMPA) is preferably used during the polymer synthesis to introduce the carboxyl groups along the polymer chain. The level of included carboxyl groups that is used to form stable dispersions is achieved by introducing enough DMPA to yield polymeric material with an acid number (calculated as mg of KOH required to neutralize 1 gram of polymer) between about 15 and 50, more preferably between 20 and 40. In the water-borne polyurethane dispersion, the acid groups are partly or completely neutralized with triethyl amine, or less frequently with dimethyl ethanolamine.

Urethane groups result from the reaction of the isocyanate groups with the hydroxyl groups in the DMPA and in the oligomeric polyesters, polyethers or polycarbonates that provide the flexibility in the dispersed urethane. These oligomers will be described by example in the next section as the "soft segments" in the urethane polymer. This well-known reaction is promoted by heat and by tin catalysts to produce an isocyanate terminated prepolymer containing pendant carboxyl groups. In this step the NMP (i.e., 1-methyl 2-pyrrolidone) becomes important. NMP dissolves the DMPA and thins the prepolymer. As will be illustrated, the prepolymer is neutralized with a tertiary amine, usually triethyl amine, and then added with stirring to water containing a diamine such as ethylene diamine or hydrazine. The diamine or hydrazine react much faster with the residual diisocyanates than water to extend the polymer to higher molecular weight and to cause urea and hydrazide groups to form.

The synthesis and properties of water-borne polyurethane dispersions are described in the open literature including K. Hatada, T. Kitayama, and O. Vogle, *Macromolecular Design of Polymeric Materials*, Marcel Dekker, Inc., New York. 1997 (Chapter 31, Section 7 "Water-borne Urethane Coating Systems (Aqueous Dispersions)"), D. Dieterich, Prog. Organic Coatings, 9:281 (1981), J. W. Rosthauser and K. Nachtkamp, *Urethane Science and Technology*, vol. 10 (K. C. Frisch and S. L. Reegen, eds.) Technomic Publishing Co., Stamford, Conn. (1971) (page 133), R. E. Tirpak and P. H. Markusch, *Proceedings of the Water Borne and Higher Solids Coatings Symposium*, New Orleans, La. February 1985 (page 159), and B. K. Kim and T. K. Kim, *J. Appl. Polym. Sci.*, 43:393 (1991).

Polyurethane dispersions may contain three principal types of soft segments made from polyester diols, polyether diols and polycarbonate diols. Poly(neopentyl glycol 1,6-hexanediol adipate) diol of about 1000 molecular weight (Mw) is a typical polyester diol. Polycaprolactone diol is a polyester made from caprolactone and an initiating diol, often diethylene glycol. Polytetramethylene ether diol of about 1000 Mw is a typical polyether diol. 1,6-hexanediol polycarbonate of 1000 Mw is a typical polycarbonate diol. Other molecular weights of these "soft segments" with molecular weights from 500 to 3000 are also available and acceptable for use in grout products.

The specific soft segment may be selected based on the desired properties. For example, polyurethane dispersions using polyester diols or diols from caprolactone, produce films that have good resistance to photo oxidation but are prone to degradation by hydrolysis under hot/wet conditions. Polyurethane dispersions from polyether diols produce films that have good hydrolysis resistance but will photo oxidize. Polyurethane dispersions made using polycarbonate diols produce films that have good hydrolysis resistance and are not easily photo oxidized so long as they are made using aliphatic diisocyanates.

Water-borne polyurethane binders are typically clear and permit the passage of light therethrough. Water-borne polyurethane binders may have a refractive index of about 1.496. Pigments may optionally be added to the water-borne polyurethane to provide a desired grout color. Pigment addition of from about 0.002 to about 0.2% by weight of the water-borne polyurethane can yield a tinted grout similar to tinted glass. Representative pigments are the TINT-AYD® series of water-borne pigments available from Elementis Specialties, Inc. of Hightstown, N.J.

Water-borne polyurethanes are commercially available from several manufacturers. Sources include: Chemtura Corporation of Middlebury, Conn., Bayer MaterialsScience LLC of Pittsburgh, Pa., and Alberdingk Boley, Inc. of Greensboro, N.C.

Table 1 identifies representative anionic water-borne polyurethane dispersions available from Alberdingk Boley, Inc. and which may be utilized as water-borne polyurethane binder systems in grout products. The water-borne polyurethane dispersions described in Table 1 would have different balances of hardness and flexibility as reflected in their different elongation and hardness of films formed from the polyurethane dispersions. The range of hardness and flexibility permits the grout formulator to formulate a grout with desired flexibility and hardness. Flexibility can be desirable, for example, in grout applications in which the substrate to which the grout is adhered may move or bend. Combinations of PUDs may be used. Alberdingk Boley U915, which forms one of the hardest and lowest elongation films from this set of materials, is an example of a preferred water-borne polyurethane for use with tile installed on most substrates. (Asterisks indicate information not available.)

Table 1

Representative Alberdingk Boley
Anionic Water-Borne Polyurethane Dispersions

| No. | Product Code | Percent Solids | Percent Elongation at Break | Konig Hardness | Soft Segment |
|---|---|---|---|---|---|
| 1 | U 325 | 39-41 | 650 | 30 | Polyester |
| 2 | U 3305 | 32-34 | 800 | 30 | Polyester |
| 3 | U 325 | 39-41 | 650 | 30 | Polyester |
| 4 | U 520 | 39-41 | 500 | 30 | Polyester |
| 5 | U 610 | 29-31 | 400 | 50 | Polyester |
| 6 | U 615 | 38-40 | 250 | 80 | Polycarbonate |
| 7 | U 800 | 38-41 | 300 | 80 | Polycarbonate |
| 8 | U 801 | 39-41 | 300 | 80 | Polyester |
| 9 | U 910 | 29-31 | 60 | 155 | Polyester |
| 10 | U 911 | 29-31 | 25 | 150 | Polycarbonate |
| 11 | U 915 | 33-35 | 27 | 115 | Polycarbonate |
| 12 | CUR 60 | 36-38 | * * * | 90 | Castor oil acrylic hybrid |
| 13 | CUR 69 | 34-36 | 176 | 95 | Castor oil polycarbonate |
| 14 | CUR 99 | 29-31 | 60 | 115 | Castor oil |
| 15 | CUR21 | 58-60 | 700 | 20 | Castor oil |
| 16 | APU 1012 | 42-44 | * * * | 60 | Acrylic polyester polycarbonate |
| 17 | APU 1014 | 35-37 | * * * | 90 | Acrylic polyester polycarbonate |
| 18 | APU 1035 | 41-43 | * * * | 110 | Acrylic polyester |
| 19 | APU 1060 | 36-38 | * * * | 110 | Acrylic polyester polycarbonate |
| 20 | APU 1061 | 32-34 | * * * | 120 | Acrylic polyester polycarbonate |
| 21 | APU 1061 | 38-40 | * * * | 110 | Acrylic polyester polycarbonate |

A benefit of aliphatic PUDs is that such materials are resistant to degradation from UV radiation. Aliphatic PUDs retain color and resist yellowing when exposed to UV radiation. As a result, aliphatic PUDs, and grouts formulated to include aliphatic PUDs, are excellent for use in exterior applications and applications where exposure to UV radiation is expected. Exemplary applications for which grouts of the type described herein would be useful would include patios, pools, decks and fountains.

Filler material used to formulate grout components of grout compositions are provided for purposes including to augment grout weight, fill space, or alter the visual appearance of the grout, and can provide other performance benefits. In embodiments, filler represents about 75 to about 87 weight percent of the grout component used to formulate grout. One or more fillers may be utilized based on the formulator's needs.

Several broad filler types are generally preferred. One filler type comprises quartz particles which may be colored or uncolored. A second filler type comprises fine powder filler. A third filler type comprises light-transmissive particles.

Combinations of filler types and combinations within filler types may be selected in grout formulation providing the formulator with flexibility to formulate grouts relevant to the application. Fillers may be selected, for example, based on the desired grout texture, grout fill volume requirements, or grout translucency, to name a few. Other benefits that can be achieved by varying the filler component are faster dry time, higher compression strength, and more color consistency of the grout.

Quartz particles are one preferred filler material type. Quartz particles consist of about 99.8% silicon dioxide ($SiO_2$), which is also referred to as silica. Quartz particles generally have a hardness of about 6.7 to 7 on the MOH hardness scale. Quartz particle bulk density is typically between about 90 to about 100 lbs./ft$^3$ with a specific gravity of about 2.65.

Quartz particle fillers preferably range in diameter from about 74 microns (µm) (200 mesh) to about 300 µm (50 mesh). Preferably, the quartz particles are generally rounded which facilitates grout spreading. Quarried quartz particles having a more angular particle geometry can be used, although they are less preferred. Quartz particles in the particle size range of about 180 to about 300 µm tend to be rounded naturally. The particles can also be rounded by mechanical means, such as by tumbling. Representative quartz particles may consist of a single particle size or a distribution of particle sizes.

Quartz filler may be uncoated or coated with a permanent cured colorant system prior to being combined with a binder system containing a PUD system. A standard grout with a satisfactory workable consistency preferably comprises about 87% by weight filler and about 13% of a binder system containing a PUD.

A preferred particle size range to achieve this consistency would be particles that range from about 210 µm (70 mesh) to about 297 µm (50 mesh). This workability allows the grout mixture to easily be applied into joints as wide as 2 inches and as small as ⅛ inch. For a grout that would be desired to have a smoother texture, able to be easily applied in smaller, thinner joint sizes (i.e., about ⅛ inch to about 1/32 inch) it would be desirable to use a particle size range of about 74 µm (200 mesh) to about 210 µm (70 mesh). This filler particle size range would provide nicely filled very small and thin joints with a better volume of grout having a smoother finish. Such complete joint filling would provide a thin joint more strength from wear and tear. Due to the relatively more complete and dense packing of the smaller particles, and the relatively greater surface area of smaller particles, it is preferred that relatively more PUD binder be used in such grout formulation, possibly on the order of about 10 to about 15 weight percent more than grouts based on larger quartz particles.

Quartz particles suitable for use in the grouts may be coated or uncoated. Coated particles are particles provided with an inorganic pigmented coating to provide a desired color. Uncoated quartz particles may be opaque or light-transmissive.

Colorquartz™ brand quartz particles available from 3M Company of Minneapolis, Minn. represent a type of pigmented quartz particle which may be used as a filler in grout embodiments. Other suitable quartz products for use as filler include Permacolor BC Grade quartz granules manufactured by Clifford Estes Corporation of Totowa, N.J. Such quartz materials are provided in a broad range of colors. Colored quartz filler is generally beneficial because the color applied by the manufacturer is very accurate and consistent. This allows for a consistent grout color match. The colorant systems also are UV stable and chemical resistant which allows the end user to have consistent grout color that is not affected by free pigment that may "wash out" or separate from the grout during routine cleaning. And, colored quartz consistency avoids grout color variation during application into the joint or other surface.

Grout consistency and the grout texture, ranging from coarse to smooth, can be modified based on the quartz filler. And, such grout consistency and texture may be modified further by including fine filler, examples of which are described herein, in combination with quartz filler.

Fine, powder-grade fillers comprising silica may be used in grout as an inexpensive filler to add bulk and give the grout volume and body. Fine fillers may be used to fill interstitial spaces between larger filler particles to provide grout with a smooth surface texture and desirable spreading characteristics. Preferred fine powder-grade fillers preferably have a particle size diameter in the range of from about 5 μm to about 400 μm (40 mesh). A more preferred particle size range is from about 45 μm (325 mesh) to about 250 μm (60 mesh). A particularly preferred fine filler is Sil-co-Sil 125 grade which has predominant particle sized diameter of about 45 μm (325 mesh). Sil-co-Sil 125 is manufactured by U.S. Silica Corporation of Berkeley Springs, W. Va. Other grades of fine powder grade silica are also available from U.S. Silica Corporation.

The use of silica filler is desirable due to the ability of the polyurethane in the PUD to permeate the fine filler particles, allowing the PUD binder and filler to blend in with minimal effect on the overall grout color. Fine powder-grade fillers are typically most useful in combination with larger particle size fillers.

A unique aspect of certain grout embodiments as described herein is that grout may be formulated to permit passage of light therethrough so as to provide a color reflective of the adjacent glass tile, tile, or other material adjacent to the grout. Such light-transmissive or translucent fillers are a filler type that permits the passage of light with varying degrees of light scattering. This unique aspect permits the grout to complement or enhance the appearance of adjacent materials. For example, brightly-colored glass tile is emerging as a popular design choice for bathrooms, kitchens and murals. Grout is required to fill the joints between such tiles. Grouts including light-transmissive fillers can be utilized to fill such joints because the grouts take on the appearance of the glass tile, providing a seamless appearance between the glass tiles and enhancing the beauty of the glass tile. Grout with light-transmissive filler may be admixed with accelerator if more rapid TSH is desired or may be applied without accelerator.

Formulation of light-transmissive grout is made possible because water-borne polyurethane of the binder system is typically clear or generally clear, permitting scattered and unscattered light transmission therethrough. Since the filler typically comprises a major fraction of the grout component, selection of a filler or fillers which also permit passage of light therethrough can result in a grout which is translucent or transparent.

Various filler materials may be utilized as light-transmissive fillers. Preferred examples are glass beads, acrylic beads, polypropylene beads, polycarbonate beads, polystyrene beads, urethane beads and polyethylene beads. Combinations of any of these preferred light-transmissive fillers may be used to achieve various levels of translucency. Beads are most highly preferred for grouts wherein light passage is desired. Use of less-rounded particles is possible but increased light scattering may result.

Glass beads typically consist of various types of recycled glass. The basic chemical composition of glass beads is glass oxide, CAS No. 65997-17-3. Glass beads suitable for use in light-transmissive grouts may be solid or hollow. Solid glass spheres are a particularly preferred light-transmissive filler material. Suitable glass beads typically have a fraction of sphere-like or round beads on the order of about 65% to about 85% in a given batch. In examples, glass beads may have a refractive index of about 1.51 to about 1.55. Examples are SPHERIGLASS® solid glass spheres and SPHERICEL® hollow glass spheres available from Potters Industries, Inc. of Malvern, Pa. are representative glass beads suitable for use in making grouts.

Glass beads create a type of translucent effect in the cured grout which can result in a near-colorless grout. This grout embodiment has many applications, particularly for use with glass-type tile and mosaic tile, as well as any application where the grout is desired to appear less visible. This grout embodiment also has a light-reflectance characteristic. When the grout is placed between glass colored tiles, the grout will reflect the color of the tile giving the grout the appearance of becoming the shade of color of the surrounding tile or object.

Preferably, light-transmissive fillers have an average particle size diameter in the range of about 44 μm (325 mesh) to about 850 μm (20 mesh). Representative light-transmissive fillers may consist of a single bead size or a distribution of bead sizes.

By way of example only, a grout component comprising about 80 weight percent glass bead filler with a particle size range of about 210 μm (70 mesh) to about 297 μm (50 mesh) provides a light-transmissive grout with a smooth texture, good grout packing (improving grout strength) and which may be cleaned easily. Such a grout would be ideal, for example, for application to relatively larger joints of about 0.0625 to 0.250 inches.

Grout light-transmissivity and grout performance can be modified by adjusting the particle sizes of the filler. As shown in Examples 65-72 and Table 9 below, translucency decreases as glass bead particle sizes decrease. Decreased grout translucency causes the grout to be less reflective of surrounding colors, such as multiple colors found in mosaic glass tile or in tinted clear glass tile. The use of grout including a relatively decreased translucency could be useful in applications wherein it is desired to emphasize the appearance of the adjacent materials. Use of a grout including a relatively increased translucency could, for example, be useful for applications such as swimming pools, bath rooms, fountains, steam rooms and other water or submersed applications, where reflective properties would add unique aesthetics.

By way of example only, a grout with a filler comprising glass beads having a particle size range of about 210 μm (70 mesh) to about 850 μm (20 mesh) increases light transmissivity and creates an attractive type of three-dimensional effect. Grout with light-transmissive filler in this particle size range would work well in grout applications where a more textured look, or feel, is desired.

By way of further example, a grout with a filler comprising glass beads having a particle size range of about 44 μm (325 mesh) to about 150 μm (100 mesh) decreases light transmissivity to create a very slight, but attractive, translucent effect. At the same time, use of the relatively smaller filler particle sizes provides for a very smooth grout with excellent workability characteristics. Such grout is easily workable into small joints where a smooth grout appearance is highly desirable. For example, such a grout would be ideal for use in a 0.03125 inch wide butt joint between mosaic tiles.

Grout workability can advantageously be adjusted by changing the particle size of the glass beads in the grout formulation. For example, use of glass bead sizes toward the lower end of the particle size range tend to result in a grout which is less viscous and more fluid. Such low-viscosity grouts are satisfactory in applications as a potting material (i.e., a surface-leveling material) or where settling or sagging of the grout is not an issue, such as for applications on horizontal surfaces (i.e., floor surfaces). Use of glass bead sizes toward the upper end of the particle size range tend to result in a grout which is more viscous and thickened. Such high-viscosity grouts are satisfactory in applications in vertical-surface applications and in applications in which it is not necessary to work the grout into small openings and voids, such as on tile joints which are relatively wide.

Adjustment of the ratio of water-borne polyurethane to glass bead filler can effect grout characteristics. Use of relatively less water-borne polyurethane binder and relatively more glass bead filler can reduce the compressive strength formed by the grout, reduce grout flexibility, and reduce the stain and chemical resistance of the grout.

While more expensive than fine powder-grade fillers, glass bead fillers are less absorbent than the fine fillers so lesser amounts of the more expensive PUD is required to produce a grout.

A further property of glass beads as a filler material which may be advantageous in certain grout applications is that glass beads have a rate of grout curing which has been observed to be faster than filler powder-grade materials such as silica flour. Glass beads have been observed to have a faster curing rate because such beads do not absorb water from the water-borne polyurethane continuous phase as does a silica flour filler. Consequently, water evaporates more readily from the interstitial spaces between the glass bead particles during grout curing, contributing to formation of a hard grout material more rapidly than in grouts which use a silica flour filler. FIG. 1 is a graph providing data showing that grout formulations including glass bead filler form high compressive strengths relatively faster than grout formulations including silica flour filler as a function of time.

Glass beads also reduce settling of the grout during shipping or transport, thus requiring less admixing of the grout in the bucket by the end user prior to grout application and providing ease of use by the applicator. Glass beads used in combination with quartz fillers can be formulated to provide excellent filler packing resulting in a grout with excellent workability properties.

Grout formulations including light-transmissive filler may optionally include a color tint, preferably added to the PUD-containing binder system. If included, the tint provides an attractive color hue to the grout yet preserves the light-transmissive effect. Alternatively, grout tinting may be accomplished by use of a tinted light-transmissive filler which, when used with a clear or tinted PUD-containing binder, produces the desired effect. By way of example only, glass beads could be provided with a slight green-colored tint to provide a green appearance to the applied grout. The formulator may use tint to reduce or eliminate the light-transmissive effect of the grout as desired.

Opaque fillers or other materials may be provided in small amounts to accent the grout. For example, small amounts of colored quartz may be added to provide a flecked or speckled appearance in the grout.

Addition to the grout component of an accelerator component provides a grout with a controlled rate of grout curing. More specifically, it has been unexpectedly found that use of such accelerators provides grouts with a time to grout surface hardness (i.e., a TSH) which is significantly less than that of grouts which harden by the normal process of water and solvent evaporation while at the same time providing grouts with adequate time for grout application (i.e., TAA).

Representative accelerators for use as an accelerator component are divalent or trivalent metal oxides and hydroxides. Highly preferred examples of divalent metal oxides and hydroxides are magnesium oxide (MgO), magnesium hydroxide (Mg(OH)$_2$), and zinc oxide (ZnO). Combinations of these materials may be used.

Other accelerator materials have been identified which significantly accelerate the rate of grout curing. However, these accelerators are less preferred because they are highly reactive, resulting in near-immediate grout hardening. Examples include, calcium sulfate hydrate (CaSO4.H2O), and calcium, strontium, and barium oxides and hydroxides. These latter accelerators result in a grout with a shortened TAA which may be unacceptable to some grout users. Although not tested, it is theorized that trivalent metal oxides and hydroxides such as aluminum oxide (Al$_2$O$_3$) and hydroxide (Al(OH)$_3$) may have efficacy as accelerators because of the proximity in the periodic table of aluminum to magnesium and the similarity of aluminum and magnesium.

Without wishing to be bound by any particular theory, three accelerator characteristics have been identified which appear to be indicative of a preferred accelerator. These characteristics include: (1) water solubility, (2) surface area, and (3) surface reactivity with the anionic urethane dispersion polymer.

In general, a relatively lower solubility of the accelerator in water is believed to be desirable. An accelerator solubility in water which does not exceed 0.02 grams/100 grams water at 70° Fahrenheit is thought to be desirable. Highly water soluble compositions, such as calcium, strontium, and barium oxides and hydroxides, tend to provide very powerful acceleration and rates of grout curing. If magnesium ions are in the water phase, as they are when magnesium acetate (a water-soluble compound) is added, immediate solidification of the grout occurs. Without wishing to be bound by any particular theory, magnesium hydroxide and oxide and zinc oxide are believed to be effective because these materials have low solubility in water and are likely not contributing significant concentrations of magnesium ions to the solution.

A relatively greater accelerator surface area is also believed to be desirable. Surface area relates to surface roughness and pore concentration of the accelerator particles. Accelerators with accelerator surface areas of about 10 to about 200 square meters/gram (m$^2$/g) have been found to be effective. The ability to control the rate of reaction by adjusting the accelerator surface area is believed to be important to the utility of the accelerator and is unexpected. Surface area added is equivalent to the amount of "reactant" added. Thus, it is possible to use a lesser absolute amount of accelerator provided that the accelerator has the requisite surface area. Materials such as "dead burned" magnesium oxide are thought to be less effective as accelerators because such materials have a smooth surface (i.e., generally less surface area) and are known as being generally inert.

And, surface reactivity of the accelerator with the anion urethane dispersion polymer is believed to be desirable. It is theorized that the mechanism of accelerator action is the interaction of positively charged ions on the accelerator surface with the preferred anionic carboxyl groups on the urethane polymer. Reactivity of positive ions on the accelerator surface with the anionic urethane dispersion polymer is believed to be desirable in forming "bridges" between urethane particles, thereby forming higher molecular weight urethane molecules contributing to rapid grout hardening.

The amount of accelerator component to be admixed with the grout component may be determined by reference to the amount of accelerator surface area provided in the total grout composition. Accelerators with relatively more surface area are more active accelerators. Preferably, the total accelerator surface area is about 1 to about 60 square meters per 100 grams of grout. It is preferred that the accelerator selected have a surface area of about 10 to about 200 square meters per gram ($m^2/g$). An accelerator surface area of about 20 to about 60 $m^2/g$ is preferred. It is generally preferable to add as little accelerator component to the grout component as possible so as to avoid any possible changes in grout color. Therefore, accelerators with a relatively greater surface area tend to be preferred.

For magnesium oxide and magnesium hydroxide accelerators having surface areas from about 10 to about 175 $m^2/g$, a preferred ratio of accelerator to grout component is in the range of about 0.03 to about 1.6 parts accelerator component to about 100 parts grout component as supported, for instance, in Examples 1-36 herein.

Figure 4:
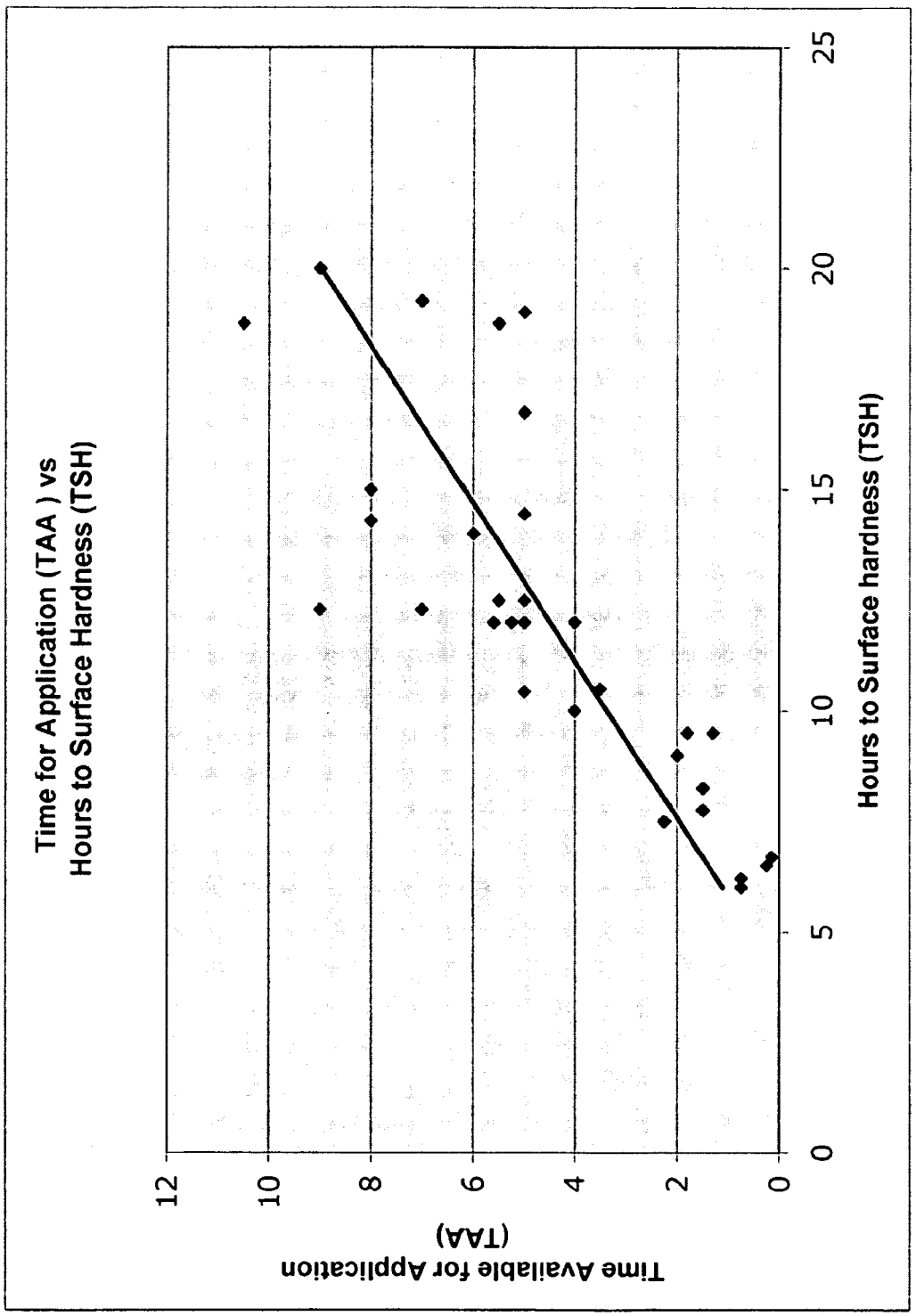
FIG. 4 is a graph illustrating that control over grout curing is predictable and that control can be provided to achieve a desired TAA and time to surface hardness (TSH).

Grouts containing an accelerator component may be formulated to have the desirable balance between time for grout application (TAA) and time to grout surface hardness (TSH) as is graphically illustrated in FIG. 4 which is based on Examples 1-36. Such balance provides a grout which remains workable for a time adequate to apply the grout to the desired surface or to work the grout into a series of tile joints. And such a balance provides a grout which enables the grouted surface to accommodate traffic and cleaning within a time duration that is materially less than the time required for curing of a grout not including an accelerator.

For example, grouts including an accelerator component harden sufficiently fast to permit use of the grouted surface in about 6 to about 16 hours from as much as 28 to 72 hours for grouts not including accelerator. This difference in curing rate permits grout applied in an afternoon to be ready for use the following morning. Useful concentrations of magnesium hydroxide or oxide preferably provide a time available for application (TAA) of at least about 30 minutes. This is contrary to expectations raised by the observation that many magnesium and calcium compounds are either inert, or cause solidification of the grout in a few seconds.

The increase in the rate of grout curing is also beneficial because rapid grout curing minimizes the chance of grout discoloration and grout softening which can occur if the grout is contacted by moisture before the grout cures. Moisture avoidance before curing is a particular issue when applying grout in exterior applications, such as decks, swimming pools, or patios. And, addition of accelerator has been found to make the grout more resistant to moisture in high-humidity applications such as in the "mud bed" commonly used in custom shower floors and steam rooms.

Magnesium oxide is commercially available from Martin Marietta Magnesia Specialties, LLC of Baltimore, Md. Representative Martin Marietta magnesium oxides suitable for use as grout accelerator include: Magchem® 10-325S (hard burned), Magchem MH-10 (typ. surface area 10 $m^2/g$), Magchem MH-10-UF (typ. surface area 17 $m^2/g$), Flomag-H-US (60% MgO dispersion) (typ. surface area 17 $m^2/g$), Magchem 30 (typ. surface area 25 $m^2/g$), Magchem 35 (typ. surface area 30 $m^2/g$), Magchem 40 (typ. surface area 45 $m^2/g$), Magchem 50 (typ. surface area 60 $m^2/g$), and Magchem 200AD (typ. surface area 175 $m^2/g$).

Magchem 200AD is a high purity, highly reactive micronized magnesium oxide processed from magnesium-rich brine. Magchem 200AD has a loose bulk density of about 15 to about 25 $g/cm^2$, a mean particle size of about 1.2 to about 1.5 µm, and a surface area of about 160 to about 200 $m^2/g$, with 175 $m^2/g$ surface area being typical. Magchem 200AD is reported to consist of about 98.9% magnesium oxide, about 0.35% calcium oxide (CaO), about 0.30% silica ($SiO_2$), about 0.16 iron oxide $Fe_2O_3$), about 0.012 to about 0.0135 chloride (Cl), and about 0.15 sulfate ($SO_3$).

Other magnesium oxides suitable for use as grout accelerator include MAGOX® Super Premium, MAGOX Premium, and MAGOX 98HR magnesium oxides (typ. surface areas of 150, 120, and 65 $m^2/g$ respectively) available from Premier Chemicals LLP of Conshohocken, Pa., and ELASTOMAG® 170 and ELASTOMAG 90 magnesium oxides (typ. surface areas of about 165 and 90 $m^2/g$ respectively) available from Rohm & Haas of Andover, Mass.

Other useful magnesium hydroxides are the aqueous suspensions sold by Martin Mariettia under the tradenames Flowmag HUS and Flowmag H.

Zinc Oxides can be obtained from Horsehead Corporation of Monaca, Pa. Horsehead Zinvisible® brand zinc oxide has a surface area of 29 $m^2/g$. USP grade zinc oxide USP-1 has a surface area of 9 $m^2/g$.

A cross-linking constituent may optionally be added to grouts containing water-borne polyurethane to provide improved grout performance. Performance enhancements can include improved grout flexibility, chemical and stain resistance, and moisture resistance with no negative effect on the time required to form a hard grout as indicated in Table 11 and Examples 73-77 below. Further, preferred additions of cross-linking constituent improve grout "bucket life," meaning that the grout is a homogenous mixture in its container without separation of the grout constituents. A bucket life on the order of several years is desirable because the grout product can be stored for use at a much later time.

Multi-functional aziridines are useful cross-linkers for use in grout. A preferred cross-linking constituent comprises tris aziridine, an adduct of trimethylolpropane triacrylate with propylene imine. Other representative cross-linking constituents include carbodiimide-based materials and water dispersible isocyanates. Combinations of such exemplary cross-linking constituents may be utilized.

The cross-linking constituent reacts with the hydroxy, carboxy, or other functionality of the water-borne polyurethane urethane moiety which can consist, for example, of monomers, oligomers, and polymers of acrylics, polyurethane dispersions, oil-derived polyols, emulsified oil polyols, polyethers, and polyesters. The reaction causes the water-borne polyurethane to form a microgel. The preferred aziridine cross-linking constituent reacts with the polycarboxylic groups of the polyurethane dispersion to yield polyaminoesters and/or aminoester microgels. Formation of the microgel structure is thought to provide improved cross linking and a more impenetrable film, thus improving grout stain and moisture resistant.

Cross-linking constituent concentration is most preferably determined based on the solids content of the water-borne polyurethane constituent. The cross-linking constituent preferably comprises about 0.5 to about 10 weight percent of the water-borne polyurethane constituent solids content. More preferably, the cross-linking constituent preferably comprises about 0.5 to about 5 weight percent of the water-borne polyurethane constituent solids content with a range of about 0.5 to about 2.5 weight percent being a highly preferred range. Grout compositions can be formulated with greater than 10 weight percent of cross-linking constituent but there does not appear to be a well-defined performance benefit resulting from such additions.

Determination of the cross-linking constituent concentration is based on the hydroxy, carboxy, or other functionality content of the water-borne polyurethane. The objective is to react sufficient groups of the hydroxy, carboxy, or other polyurethane functionality content to provide microgelling, while allowing sufficient hydroxy, carboxy or other reactive groups to remain free to allow the binder to form a continuous film during the curing process following grout application.

Table 2 illustrates determination of the concentration of a representative tris aziridine cross-linking constituent based on consumption of carboxyl reactive groups present in an Alberdink Boley U915 PUD. Tris aziridine theoretically contains about 6.42 miliequivalents (meq) of aziridne in 1 gram of the adduct. An exemplary Alberdink Boley U915 PUD which may be used to manufacture a water-borne polyurethane-based grout includes approximately 34% solids and has an acid number of 21.2. The polyurethane contains 0.378 miliequivalents of carboxyl groups per gram solids based on the acid number of 21.2 for the polyurethane solids. Thus, 100 grams of PUD solids would contain about 37.8 miliequivalents of carboxyl groups. The polycarboxylic-group-containing polyurethane reacts with the tris aziridine to yield a branched polyaminoester and/or aminoester microgel.

Table 2 provides data showing the carboxyl group content of 100 grams of the exemplary Alberdingk Boley U915 PUD resulting from addition of from 1 to 10 grams of tris aziridine. Table 2 shows the decrease in carboxyl group content as the amount of tris aziridine cross-linking constituent is increased.

TABLE 2

Modification of Carboxyl-Containing Water-Borne Polyurethane with Aziridine Crosslinker

| Aziridine (g) | Aziridine (meq) | Carboxyl Groups in 100 g PUD (meq) | Carboxyl Groups Consumed (%) |
|---|---|---|---|
| 1 | 6.42 | 37.8 | 17.0 |
| 2 | 12.84 | 37.8 | 34.0 |
| 3 | 19.26 | 37.8 | 51.0 |
| 4 | 25.68 | 37.8 | 67.9 |
| 5 | 32.10 | 37.8 | 84.9 |
| 10 | 64.20 | 37.8 | 169.8 |

As shown in Table 2, 1 gram of tris aziridine reacted with the PUD containing 100 grams of carboxyl solids resulting in consumption of 17% of the carboxyl groups. Two grams of tris aziridine in the reaction consumed 34% of the carboxyl groups and 10 grams of tris aziridine is calculated to consume a substantial excess of the carboxylic groups. The optimal tris aziridine concentration was about 2 grams, a concentration which provides performance benefits as reflected in Table 2, yet does not retard grout curing or cause long term bucket instability. This is an improvement over certain cross-linking constituents which require use of the PUD within 2 to 8 hours after cross-linking constituent addition. Other cross-linking constituents, for example, carbodiimide and isocyanate-based materials, may be added to grouts in much the same manner as tris aziridine.

Without wishing to be bound by any particular theory, it is thought that the tris aziridine migrates from the PUD water phase into the dispersed carboxyl functional urethane polymer particle. It reacts to convert the carboxyl groups into amino ester groups in a cross-linked network within the particle. As the aziridine concentration approaches equivalence with carboxyl groups (i.e., at 10 grams of aziridine in Table 2) and above, the particles no longer contain enough free carboxyl groups to be stably dispersed in water. This is the source of the increasingly shorter bucket life beyond the approximately 5 parts of aziridine to 100 parts of PUD solids. In fact, it is preferred to add no more than 3 parts of crosslinker to 100 parts of PUD solids to assure years of bucket life of the product.

Low levels of aziridine crosslinker, less than 5%, provide some build up in molecular weight and a low level of crosslinking in the polyurethane dispersed particle. This improves physical properties and chemical resistance without sacrificing bucket life and film forming characteristics. It is unexpected that the addition of a very reactive crosslinker to the dispersion would lead to an improved grout with an enhanced bucket life of 12 to 24 months.

Addition of a preferred 2.5 weight % aziridine (based on PUD solids content) during manufacture results in a grout including cross linking in the container and before grout application. It is unnecessary to add cross-linking constituent to the grout prior to use in order to provide the desired grout properties, thereby providing grouts which are easier for the worker to apply because less pre-use mixing is required.

Grouts including a cross-linking constituent have application in applications in which contact with water is anticipated because grouts including cross-linking constituent are highly resistant to moisture degradation and softening. Applications include use of grouts in underwater areas of swimming pools, exterior decks and driveways, showers, saunas and other grout applications that require resistance to moisture. Grouts including an aziridine cross-linking constituent may be used in harsh environments, such as in hospitals, meat processing plants, veterinary facilities and other applications where resistance to blood, urine and other materials is expected and where thorough cleaning practices are required. Grouts including an aziridine cross-linking constituent may be used in applications in which it is expected that the gouts will be exposed to highly alkaline cleaners, foam acid cleaners, chlorinated disinfectants, sanitizers and solvent-based cleaners.

Chemtura Corporation of Middlebury, Conn. is a commercial source of aziridine and isocyanate cross-linking constituents. An exemplary aziridine is available under the trade name Witcolink AZ 28. Aziridines are also available from Bayer Material Science of Pittsburgh, Pa., under the tradenames PFAZ® 322 and XAMA® (a polyfunctional aziridine utilized as a cross-linking agent and adhesion promoter and modifier).

Grout stain resistance may optionally be improved by inclusion in the grout of a silicone-containing emulsion constituent. A silicone-containing emulsion content of about 5 weight percent or less based on the polyurethane content of the grout provides a preferred balance of cost and effective fluid absorption control and stain resistance.

Inclusion of a silicone-containing emulsion, for example an emulsion containing silanes and/or siloxanes, as a grout constituent reduces grout contaminant and soil absorption yet permits passage of moisture through and away from the hardened grout, permitting the grout to dry when exposed to moisture. It is desirable that moisture on grout be permitted to evaporate from the grout to avoid mold and mildew growth. Further, inclusion of the silicone-containing emulsion constituent in the grout, rather than as a coating applied to the grout surface, minimizes grout wear by abrasion from, for example, foot traffic. And incorporation of the silicone-containing emulsion in grout provides extensive long-term protection against staining by fluids that would otherwise permeate and stain the grout.

One representative silicone-containing emulsion suitable for use as a grout constituent is Silres® BS 1001A silicone water repellant available from Wacker Chemical Corporation of Adrian, Mich.

Latex thickener may optionally be added to grout compositions to provide bucket stability during transport and storage prior to application. The amount of latex thickener is preferably one that provides a balance between long bucket life and grout with desired workability.

A preferred range of latex addition is about 0.006 to about 0.03 weight percent based on the polyurethane content of the PUD. A more preferred range of addition is about 0.006 to about 0.01 weight percent based on the polyurethane content of the PUD.

UCAR POLYPHOBE Rheology Modifier TR-116 available from The Dow Chemical Company is an example of a representative latex thickener. Acrysol RM 825 manufactured by Rohm & Haas of Philadelphia, Pa. is a further exemplary latex thickener.

Antimicrobial agents, such as Rocima™ microbicides from Rohm & Haas of Philadelphia, Pa. may be added to the grout.

An exemplary batch manufacturing process for producing a grout for packaging in a standard two gallon plastic pail containing 18 lbs. of grout is as follows. Grout compositions may also be made in a continuous process. It will be understood that any suitable packaging type and size may be utilized. According to the example, the "wet" grout components are first admixed to provide a grout component. There is no particular mixing order for the wet components. If accelerator is to be used, the accelerator is most preferably admixed with the grout component by the technician just prior to grout application.

In the example, water-borne polyurethane (Alberdingk Boley U915) is first measured into a mixing vessel at room temperature and pressure. In the example, 356 lbs. of water-borne polyurethane is measured into the vessel. Next, 19 lbs. of a silicone-containing emulsion (Silres® BS 1001A) and 0.90 lbs of an anti-microbial agent (Rohm & Haas Rocima 63) are added to the vessel. Any additives for a plural-component binder system are preferably admixed separately with the water-borne polyurethane but may also be added separately, preferably as a part of the wet components.

The wet components are admixed with a 12 inch diameter motor-driven spindle at approximately 100 rpms for about 5 to 10 minutes. Next, 2.4 lbs of cross-linking constituent (aziridine) are added to the vessel. The wet component admixture is mixed further at about 100 revolutions per minute (rpm) with the motor-driven spindle until completely admixed. The wet component admixture is pumped from the mixing vessel into a 5 ft long blender at the rate of approximately 35-36 lbs. per minute. The blender paddle blends the wet component admixture at approximately 350 rpms.

The dry components are admixed with the wet components in the blender. The filler or fillers, and any other dry additives are metered into the blender and are blended into a homogenous admixture by the blender. The admixture is extruded through an exit orifice into two gallon pails. When the grout weight in each pail is about 18 lbs., an automatic arm pushes the filled pail onto a conveyor. The filled pail is sealed with a vapor-tight lid.

The accelerator may be packaged in an airtight container separate from the grout. The pre-mixed grout and accelerator could be supplied to the customer in the form of a grout kit. If accelerator is to be used, the accelerator would best be post-added to the grout component in the field just prior to grout application. The accelerator may be mixed with the grout, for example, using a high-speed drill (500-800 rpm) and mixing paddle for a period of about 60 seconds. The grout is preferably applied immediately.

It is also envisioned that the grout can be provided in plural-component kit systems in which the wet and dry constituents are supplied separately. The wet and dry constituents could be admixed at the job site and any accelerator added just before application.

EXAMPLES AND DATA

In each of the non-limiting examples which follow, waterborne polyurethane-containing grouts with a controlled rate of grout curing were evaluated. For each example, the formulation is described and comments regarding the formulation or the resulting composition are provided.

Examples 1-36

Grout Containing Magnesium Oxide and Hydroxide Accelerators

Examples 1-36 demonstrate that exemplary accelerators comprising magnesium oxide and magnesium hydroxide, in solid and slurry forms, are effective at controlling the rate of grout curing and can be used in grout formulations to provide grouts with predictable TAA and TSH properties. The data show that there is a predictable relationship between accelerator surface area and TAA and TSH.

Examples 1-36

Base Formulations

A base grout formulation was prepared for each of Examples 1-36. Table 3 lists the constituents used in preparing the base grout formulation.

TABLE 3

Examples 1-37 Base Grout Formulation Constituents

| No. | Constituent | Amount (lbs.) | Amount (wt. %) |
|---|---|---|---|
| 1 | PUD Binder:<br>Source: Alberdingk Boley U915 | 2.85 | 15.8 |
| 2 | Filler: Quartz particles<br>210-297 μm (50 to 70 mesh)<br>Source: Clifford Estes | 13.563 | 75.3 |
| 3 | Filler: Glass Beads<br>149-177 microns<br>Source: Potters, Inc. | 1.404 | 7.8 |
| 4 | Silicone Emulsion<br>Silres 1001A<br>Source: Wacker Chemical | 0.15 | 0.83 |

TABLE 3-continued

Examples 1-37 Base Grout Formulation Constituents

| No. | Constituent | Amount (lbs.) | Amount (wt. %) |
|-----|-------------|---------------|----------------|
| 5 | Antimicrobial Agent: Rocima Source: Rohm & Haas | 0.0075 | 0.041 |
| 6 | Cross-linking Agent: Tri-aziridine Source: Chemtura Corp. | 0.025 | 0.14 |
|   | Total | 18 lbs. | 100% |

The base grout formulation of Table 3 was prepared in a batch process at room temperature as described above.

Table 4 lists the accelerator component selected for use with each base grout formulation component. Accelerators were provided in both solid powder and slurry forms to evaluate whether the form of the accelerator had any effect on the rate of grout curing. The two slurries evaluated comprised dispersions of magnesium hydroxide accelerator in 50 weight percent water. Table 4 lists the exemplary accelerators evaluated in Examples 1-36.

TABLE 4

Examples 1-36 Exemplary Accelerators

| Accelerator Type | Examples | Physical Form | Accelerator Surface Area Reported Value ($m^2/g$) | Tradename/ Source |
|---|---|---|---|---|
| Magnesium Oxide | 1 | solid powder | Low | Magchem 10-325S Martin Marietta |
| Magnesium Oxide | 2-6 | solid powder | 25 | Magchem 30 Martin Marietta |
| Magnesium Oxide | 7-8 | solid powder | 30 | Magchem 35 Martin Marietta |
| Magnesium Oxide | 9-12 | solid powder | 175 | Magchem 200AD Martin Marietta |
| Magnesium Hydroxide | 13, 15 | solid powder | 10 | Magchem MH-10 Martin Marietta |
| 50% dispersion of Magnesium Hydroxide in water | 14, 16 | slurry | 10 | Magchem MH-10 Martin Marietta |
| Magnesium Hydroxide | 17, 19, 20, 22, 23, 25, 26, 27, 31 | solid powder | 17 | Magchem MH-10-UF Martin Marietta |
| 60% dispersion of Magnesium Hydroxide in water | 18, 21, 24, 28, 29, 30 | slurry | 17 | FloMag-HUS Martin Marietta |
| Magnesium Hydroxide | 32-36 | solid powder | 20 | Solids from Milk of Magnesia® antacid |

Thirty six exemplary batches of grout formulations were prepared including both grout and accelerator components. Example 1 was provided as a control. Example 1 included base-formulation grout and hard-burned magnesium oxide, a generally inert form of MgO. Table 5 lists the reported accelerator surface area, and amounts of each grout and accelerator component evaluated in each example. The accelerator of the slurries of Examples 14 and 16 is reported without reference to the slurry water content.

Table 5 further includes a column presenting the normalized amounts of grout and accelerator for each example in terms of grams accelerator in 100 grams grout to provide a basis for comparison. In each example, grams accelerator/grams grout·100=normalized value. The right-most column of Table 5 indicates the total surface area of accelerator area added in each example. In each example, normalized value·reported accelerator surface area=surface area of accelerator area added (total). Hours available for application (TAA) and hours to surface hardness (TSH) are reported in Table 5.

TABLE 5

Examples 1-36 Grout Formulations

| Ex. | Accelerator Type/Source | Accelerator Surface area ($m^2/g$) | Grout (g) | Accelerator (g) | Grams Accelerator in 100 grams Grout | TSH (hrs) | TAA (hrs) | Added Surface Area $m^2$ to 100 g Grout |
|---|---|---|---|---|---|---|---|---|
| 1 | MgO Magchem 10-325S | low | 74.97 | 0.180 | 0.240 | 25 | 12 | low |
| 2 | MgO Magchem 30 | 25 | 73.34 | 0.152 | 0.207 | 9 | 2 | 5.2 |
| 3 | MgO Magchem 30 | 25 | 64.58 | 0.134 | 0.207 | 9 | 2 | 5.2 |
| 4 | MgO Magchem 30 | 25 | 68.02 | 0.150 | 0.221 | 8.25 | 1.5 | 5.5 |
| 5 | MgO Magchem 30 | 25 | 75.23 | 0.170 | 0.226 | 9.5 | 1.8 | 5.6 |
| 6 | MgO Magchem 30 | 25 | 80.82 | 0.240 | 0.297 | 7.75 | 1.5 | 7.4 |
| 7 | MgO Magchem 35 | 30 | 67.50 | 0.210 | 0.311 | 6.2 | 0.75 | 9.3 |
| 8 | MgO Magchem 35 | 30 | 65.41 | 0.135 | 0.206 | 6 | 0.75 | 6.2 |
| 9 | MgO Magchem 200 | 175 | 67.45 | 0.150 | 0.222 | 6.5 | 0.25 | 38.9 |

TABLE 5-continued

Examples 1-36 Grout Formulations

| Ex. | Accelerator Type/Source | Accelerator Surface area ($m^2/g$) | Grout (g) | Accelerator (g) | Grams Accelerator in 100 grams Grout | TSH (hrs) | TAA (hrs) | Added Surface Area $m^2$ to 100 g Grout |
|---|---|---|---|---|---|---|---|---|
| 10 | MgO Magchem 200 | 175 | 96.65 | 0.290 | 0.600 | 6.7 | 0.15 | 52.5 |
| 11 | MgO Magchem 200 | 175 | 73.17 | 0.073 | 0.100 | 9.5 | 1.3 | 17.5 |
| 12 | MgO Magchem 200 | 175 | 79.96 | 0.040 | 0.050 | 12 | 5.25 | 8.8 |
| 13 | $Mg(OH)_2$ Magchem 200 | 10 | 63.80 | 0.210 | 0.329 | 19.25 | 7 | 3.3 |
| 14 | $Mg(OH)_2$ Magchem 200 | 10 | 71.51 | 0.210 | 0.294 | 19 | 5 | 2.9 |
| 15 | $Mg(OH)_2$ Magchem 200 | 10 | 73.35 | 0.220 | 0.300 | 16.75 | 5 | 3.0 |
| 16 | $Mg(OH)_2$ Magchem 200 | 10 | 69.31 | 0.204 | 0.294 | 20 | 9 | 2.9 |
| 17 | $Mg(OH)_2$ Magchem MH-10-UF | 17 | 63.09 | 0.060 | 0.095 | 18.75 | 10.5 | 1.6 |
| 18 | $Mg(OH)_2$ Magchem FloMag-HUS | 17 | 66.21 | 0.096 | 0.145 | 18.75 | 5.5 | 2.5 |
| 19 | $Mg(OH)_2$ Magchem MH-10-UF | 17 | 68.67 | 0.100 | 0.146 | 14.3 | 8 | 2.5 |
| 20 | $Mg(OH)_2$ Magchem MH-10-UF | 17 | 57.13 | 0.090 | 0.158 | 15 | 8 | 2.7 |
| 21 | $Mg(OH)_2$ Magchem FloMag-HUS | 17 | 68.71 | 0.144 | 0.210 | 15 | 8 | 3.6 |
| 22 | $Mg(OH)_2$ Magchem MH-10-UF | 17 | 64.53 | 0.190 | 0.294 | 14 | 6 | 5.0 |
| 23 | $Mg(OH)_2$ Magchem MH-10-UF | 17 | 76.02 | 0.230 | 0.303 | 12 | 5.6 | 5.1 |
| 24 | $Mg(OH)_2$ Magchem FloMag-HUS | 17 | 65.03 | 0.198 | 0.304 | 12.3 | 9 | 5.2 |
| 25 | $Mg(OH)_2$ Magchem MH-10-UF | 17 | 77.70 | 0.240 | 0.309 | 12 | 5 | 5.3 |
| 26 | $Mg(OH)_2$ Magchem MH-10-UF | 17 | 71.04 | 0.220 | 0.310 | 12.3 | 7 | 5.3 |
| 27 | $Mg(OH)_2$ Magchem MH-10-UF | 17 | 59.54 | 0.190 | 0.319 | 12.5 | 5 | 5.4 |
| 28 | $Mg(OH)_2$ Magchem FloMag-HUS | 17 | 80.40 | 0.270 | 0.336 | 12 | *** | 5.7 |
| 29 | $Mg(OH)_2$ Magchem FloMag-HUS | 17 | 73.07 | 0.250 | 0.342 | 12 | 4 | 5.8 |
| 30 | $Mg(OH)_2$ Magchem FloMag-HUS | 17 | 83.13 | 0.500 | 0.601 | 10 | *** | 10.2 |
| 31 | $Mg(OH)_2$ Magchem MH-10-UF | 17 | 79.80 | 0.480 | 0.602 | 10 | 4 | 10.2 |
| 32 | $Mg(OH)_2$ MOM Solids | 20 | 44.09 | 0.130 | 0.295 | 12.5 | 5.5 | 5.9 |
| 33 | $Mg(OH)_2$ MOM Solids | 20 | 54.11 | 0.090 | 0.166 | 14.45 | 5.00 | 3.3 |
| 34 | $Mg(OH)_2$ MOM Solids | 20 | 59.97 | 0.170 | 0.283 | 10.45 | 5 | 5.7 |
| 35 | $Mg(OH)_2$ MOM Solids | 20 | 64.37 | 0.390 | 0.606 | 7.5 | 2.25 | 12.1 |
| 36 | $Mg(OH)_2$ MOM Solids | 20 | 61.71 | 0.190 | 0.308 | 10.5 | 3.5 | 6.2 |

For each example, grout and accelerators in the amounts identified in Table 5 were admixed in a first plastic cup (3 ounce volume) at room temperature of about 65° F. and 50% relative humidity (RH). Weights were determined to within 0.01 g. Each exemplary grout sample was stirred with a mixing paddle for about 20 seconds until it had a uniform appearance. Next, an amount of each exemplary grout was poured into a second plastic cup (3 ounce volume, trimmed to height of 0.25 inches to permit replication of experiments) sufficient to provide a grout depth of approximately 0.25 inches. The grout remaining in the first and second cups was then observed to determine time available for application (TAA) and time to surface hardness (TSH).

TAA was determined by periodically stirring the grout material remaining in the first cup. TAA was determined to have expired when the grout was no longer smooth and began to form lumps when stirred.

TSH was determined with reference to each 0.25 inch deep sample in the second cup. Each exemplary grout was considered to have a hard surface when the surface could no longer be indented by pushing a thumbnail against the surface, a test simulating contact between the grout and a worker responsible for grout application. The samples were tested for TAA and TSH every 15 minutes for more rapid-acting accelerators and every two hours for the slower-curing grout compositions.

Examples 1-36 demonstrate that effective control of grout curing is provided by magnesium oxide (MgO) and magnesium hydroxide ($Mg(OH)_2$) accelerators across a range of accelerator concentrations and across a range of surface area additions. Examples 1-36 demonstrate that addition of accelerator sufficient to provide about 1 to about 60 square meters accelerator surface area per 100 grams of grout is effective to decrease TSH and thereby control the rate of grout curing as efficacy is expected above and below the data ranges shown to be effective in Table 5. According to the examples, a preferred MgO surface area can be about 5 to about 10 square meters accelerator surface area per 100 grams of grout because these amounts provide 45 minutes to about 5 hours TAA and a TSH of 6 to 12 hours. According to the examples, a preferred $Mg(OH)_2$ surface area can be about 1 to about 19 square meters accelerator surface area per 100 grams of grout because these amounts provide about 3.5 hours to about 10 hours TAA and a TSH of about 7.5 to about 18.75 hours. In general, it is desirable to provide the minimum amount of accelerator required to achieve the desired TSH, for example to minimize any possibility of grout color change.

Example 7 demonstrates a combination of TSH and TAA which could be considered highly preferred by some grout applicators. The grout of Example 7 would permit the applicator 45 minutes for application (TAA) and the grout would harden (TSH) in about 6.2 hours, permitting the grouted surface to be used much sooner than unmodified grout.

Figure 2:
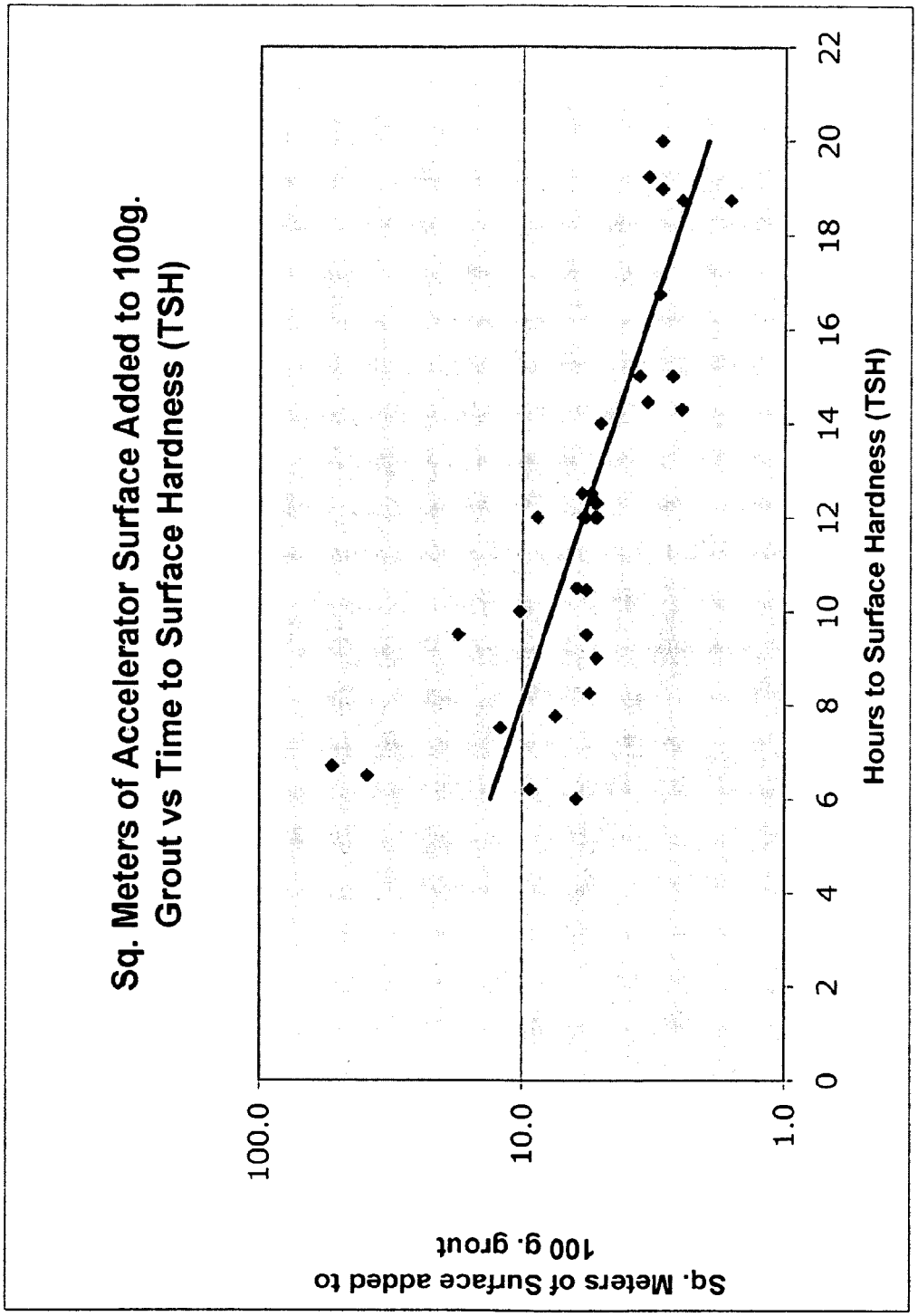
FIG. 2 is a graph illustrating the effect of accelerator surface area on grout curing as a function of time.
Figure 3:
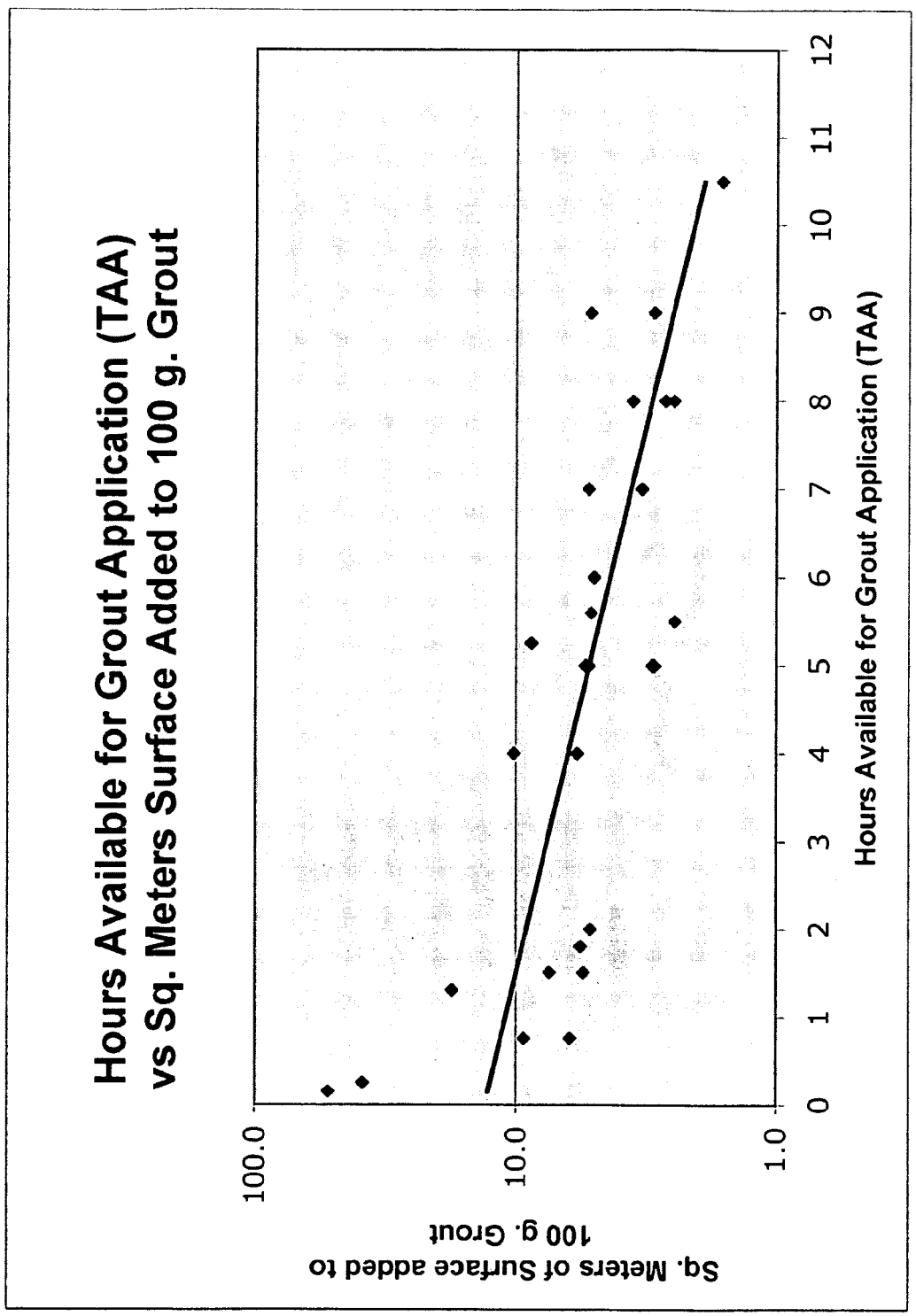
FIG. 3 is a graph illustrating the effect of accelerator surface area on time available for grout application (TAA)

FIGS. 2-4 are graphical representations of the data of Table 5 which show that control over grout curing is achieved based on selection of the overall accelerator surface area and that there is a predictable relationship between total accelerator surface area and TSH. FIG. 2 is a plot of accelerator surface area added vs. time to grout surface hardness (TSH). FIG. 2 shows relatively greater amounts of magnesium oxide and hydroxide surface area decreases the time to grout surface hardness. FIG. 3 is a plot of surface area added vs. TAA. FIG. 3 also shows that relatively greater amounts of magnesium oxide and hydroxide surface area also decrease the time to grout surface hardness. FIG. 4 is a plot of TAA vs. TSH which shows that a desired combination of application time and surface hardening can be determined based on the added surface area of the exemplary magnesium oxide and hydroxide accelerators.

Blends of accelerators with different reactivity can be used to optimize additive performance. For example, some of the more active magnesium oxides could be added to magnesium hydroxides to form a stable, more reactive accelerator dispersion. And, it is expected that blends of different accelerator types (i.e., MgO and $Mg(OH)_2$) would be effective at controlling the rate of grout curing.

Examples 37-45

Modification of Polyurethane Solid Content

Grout formulations were prepared to evaluate the effect of polyurethane solids on control of grout curing by the accelerator. A control (Example 37) and eight exemplary grouts were prepared. In each example, the grout component was prepared in accordance with Examples 1-36 except that Examples 37-41 were formulated with a Alberdingk Boley U915 PUD binder and Examples 42-45 were formulated with a CUR21 PUD binder. The urethane solids content of each PUD ranged from about 33 to about 70 weight % as reported in Table 6.

Examples 38-45 included an accelerator component comprising Magchem 200-AD magnesium oxide (surface area 175 $m^2/g$) in the weight percentage and added surface area amounts (normalized based on 100 grams grout as in Examples 1-36) indicated in Table 6.

The exemplary grouts were prepared and evaluated for TAA, TSH according to the procedure described in connection with Examples 1-36. In addition, an evaluation of when the grout achieved a tack-free state was noted. Tack free refers to a grout state in which the grout surface is not tacky to the touch. Table 6 provides the time to TAA, Tack Free, and TSH for each example 37-45.

TABLE 6

Examples 37-45

| Ex. | Urethane Solids (wt. %) | Accelerator (wt. %) | Added Surface Area $m^2$ to 100 g Grout | TAA (hrs.) | Tack Free (hrs.) | TSH (hrs.) |
|---|---|---|---|---|---|---|
| 37 | 33-35 | 0.0000 | 0.0 | 8 hours | 6 hours | 72 hours |
| 38 | 33-35 | 0.033 | 5.78 $m^2$ | .75 | 4 hours | 24 hours |
| 39 | 33-35 | 0.066 | 11.6 $m^2$ | .35 | 3.5 hours | 22 hours |
| 40 | 33-35 | 0.099 | 17.3 $m^2$ | .27 | 3.1 hours | 18 hours |
| 41 | 33-35 | 0.132 | 23.1 $m^2$ | .13 | 2.3 hours | 12 hours |
| 42 | 60-70 | 0.033 | 5.78 $m^2$ | .63 | 3.2 hours | 21 hours |
| 43 | 60-70 | 0.066 | 11.6 $m^2$ | .32 | 2.5 hours | 18 hours |

TABLE 6-continued

Examples 37-45

| Ex. | Urethane Solids (wt. %) | Accelerator (wt. %) | Added Surface Area m² to 100 g Grout | TAA (hrs.) | Tack Free (hrs.) | TSH (hrs.) |
|---|---|---|---|---|---|---|
| 44 | 60-70 | 0.099 | 17.3 m² | .22 | 1.7 hours | 15 hours |
| 45 | 60-70 | 0.132 | 23.1 m² | .125 | 1.3 hours | 11 hours |

Examples 37-42 show that grout containing a range of polyurethane solids in the PUD binder system and accelerator at a range of accelerator surface area additions can be made to harden more rapidly than grout not containing accelerator. The data show that accelerator increases the rate of grout curing. The data suggest that accelerator is relatively more effective in grout formulations including greater amounts of polyurethane solids, possibly because a greater number of anionic reactive sites are available for reaction with the positive ions along the accelerator surface. Each grout represents a useful grout product.

Examples 46-64

Single and Plural Component Binder Systems

Examples 46-64 illustrate that grout compositions can be formulated with single and plural-component binder systems and that accelerators are effective at controlling the rate of grout curing of such grouts. The data show rapid formation of grout compressive strengths indicative of grouts which are sufficiently hard to permit use after application. Plural-component binder systems may be utilized by the grout formulator to provide grout compositions with advantageous performance properties. One benefit is cost control. The grout PUD constituent is one of the more expensive grout constituents, due to the high cost of raw materials and processing. Cost savings can be achieved by admixing less-expensive additives with the PUD.

A further potential benefit of plural-component binders is that it may be possible to select an additive which decreases the time required to surface hardness (TSH). For example, materials with relatively greater amounts of polymer solids, such as epoxy acrylics and acrylics, may be provided to form co-polymers with the polyurethane. A higher solids content in the PUD binder system requires relatively less water in the grout, thereby reducing the amount of water which must evaporate and providing more rapid hardening times.

Yet another advantage is that the formulator can modify grout surface hardness by adding, for example, a relatively harder acrylic or epoxy acrylic to a relatively more flexible polyurethane to achieve modified hardness and flexibility properties in the grout.

And, addition of higher-solids-content castor oil-based PUDs to more typical PUDs can yield a more flexible grout which is quite useful for applications with glass tile systems that have a higher rate of thermal expansion than that of ceramic or porcelain tiles. Thus, modification of grout flexibility is a potential benefit of plural-component binder systems.

Yet another potential advantage of a plural-component binder systems is the capability to formulate "environmentally friendly" grouts compliant with government regulations. Blending of relatively more expensive low volatile organic content (VOC) grade PUDs with relatively less expensive PUDs containing relatively greater VOC concentrations may provide for an opportunity to both control costs while achieving compliance with government regulations as well as architectural standards.

Grouts with single and plural-component binder systems were prepared in accordance with the constituents and weight percentages listed in Tables 7A, 7B, and 7C. The grout component was prepared separately according to the exemplary mixing order discussed in connection with the method of manufacture. Examples 46-54 included an anionic waterborne polyurethane binder. Examples 55-64 included a plural component binder system comprising anionic water-borne polyurethane admixed with a water-borne acrylic styrene polymer, a co-polymer of polycarbonate and methyl-methacrylate, a modified epoxy acrylic, or a castor-oil-based polyurethane. Other suitable materials for use in binder systems include water-borne polyurethane blends containing acrylic, styrene acrylics, and acrylic epoxy hybrids. It is expected that combinations will be effective.

Alberdingk Boley U915 was provided as a water-borne polyurethane in each grout of Examples 46-64. Examples 55-57 included a plural-component binder comprising Alberdingk Boley U915 and Alberdingk Boley AS2685 water-borne acrylic styrene polymer (SACR in Table 7B). Examples 58-60 included a plural-component binder including Alberdingk Boley U915 and Alberdingk Boley UC-84VP, a co-polymer of polycarbonate and methyl-methacrylate (ACOP in Tables 7B-7C). The plural-component binder provided in Examples 61-62 included Alberdingk Boley U915 and Alberdingk Boley M2958 modified epoxy acrylic (ECOP in Table 7C). Examples 63-64 included a plural-component binder of Alberdingk Boley U915 and Alberdingk Boley CUR21 castor-oil-based polyurethane. (CUR 21 in Table 7C).

Grout examples were prepared with and without accelerator as indicated in Tables 7A-7C to determine the effect of accelerator on the rate of grout curing. If utilized, an accelerator component was admixed thoroughly with each grout component before grout application.

Each exemplary grout was evaluated for its rate of grout curing, as measured by grout compressive strength at 12 hours and at 24 hours following grout application. Rapid formation of grout compressive strength is indicative of an increased rate of grout curing.

Each exemplary grout was applied to a tile joint between 6 inch by 6 inch quarry tiles mounted on an unglazed ceramic tile substrate by means of a premixed thin set applied with a trowel having a 0.125 inch notch. The joint between tiles was between 0.25 to 0.375 inches. Temperature was between about 65 to about 72° F.

A 12 ton hydraulic jack was employed to drive a 0.165 inch diameter steel pin into each exemplary grout near the middle of each grout joint at a rate of 0.5 lbs/sec. The applied force was determined by means of a calibrated scale connected to a digital display. The greatest value observed before the steel pin penetrates the grout, was determined to be the maximum load in pounds. Pounds per square inch (PSI) was then calculated according to the following formula: PSI=load (lbs)/ 0.02138 inch$^2$. The PSI at 12 and 24 hours is recorded in each table.

Examples 53-64 of Tables 7A-7C show that grouts with binder systems including water-borne polyurethanes with acrylic or epoxy-modified acrylics are excellent grout products which can have accelerated rates of grout curing with excellent compressive strengths when admixed with an accelerator component.

hour compressive strength of 916 PSI, indicating a 63% increase in compressive strength when compared with non-accelerator-containing grout of Example 46. The grout including zinc oxide accelerator of Example 48 also showed gains in compressive strength at 12 and 24 hours versus the control of Example 46.

Examples 49-51 are grout compositions including relatively less water-borne polyurethane and relatively more quartz and glass filler when compared to Examples 46-48. Examples 50 and 51 show improved grout compressive

TABLE 7A

Examples 46-51

| Grout Constituent | Ex 46 (wt %) | Ex 47 (wt %) | Ex 48 (wt %) | Ex 49 (wt %) | Ex 50 (wt %) | Ex 51 (wt %) |
|---|---|---|---|---|---|---|
| Binder 1: Alberdingk Boley U915 | 15.85 | 15.83 | 15.84 | 11.89 | 11.87 | 11.86 |
| Binder 2 | * * * | * * * | * * * | * * * | * * * | * * * |
| Filler: Quartz Particles Source: 3M Color Quartz | 75.47 | 75.30 | 75.39 | 79.18 | 79.08 | 79.98 |
| Filler: Glass Beads Spheriglass 2024A Source: Potters Inc. | 7.81 | 7.80 | 7.80 | 8.17 | 8.16 | 8.16 |
| Cross-linking agent: Tris Aziridine Source: Chemtura Corp. | 0.14 | 0.14 | 0.14 | 0.10 | 0.10 | 0.10 |
| Accelerator | * * * | MgO 0.033 | ZnO 0.066 | * * * | MgO 0.033 | ZnO-0.066 |
| Silicone Emulsion: Silres 1001A Source: Wacker Chemical | 0.83 | 0.83 | 0.83 | 0.62 | 0.62 | 0.62 |
| Antimicrobial agent: Rocima 63 Source: Rohm & Haas | 0.04 | 0.04 | 0.04 | 0.03 | 0.03 | 0.03 |
| 12 Hour compressive strength (PSI) | 130 | 664 | 150 | 112 | 300 | 244 |
| 24 Hour compressive strength (PSI) | 336 | 916 | 374 | 168 | 522 | 504 |

Examples 46-48 of Table 7A demonstrate that magnesium oxide and zinc oxide provide measurable improvement in control over grout curing. Example 47 was formulated with Martin Marietta Magchem 200AD accelerator and had a 24 strength for the grouts containing MgO and ZnO accelerators versus the control of Example 49. The grouts of Examples 50-51 showed, on average, a 68% increase in compressive strength.

TABLE 7B

Examples 52-58

| Grout Constituent | Ex 52 (wt %) | Ex 53 (wt %) | Ex 54 (wt %) | Ex 55 (wt %) | Ex 56 (wt %) | Ex 57 (wt %) | Ex 58 (wt %) |
|---|---|---|---|---|---|---|---|
| Binder 1: Alberdingk Boley U915 | 22.35 | 22.30 | 22.21 | 7.925 | 7.92 | 7.915 | 7.925 |
| Binder 2 | * * * | * * * | * * * | 7.925 SACR | 7.92- SACR | 7.915 SACR | 7.925 ACOP |
| Filler: Quartz Particles Source: 3M Color Quartz | 69.09 | 69.93 | 68.72 | 75.47 | 75.30 | 75.39 | 75.47 |
| Filler: Glass Beads Spheriglass | 7.13 | 7.12 | 7.09 | 7.81 | 7.80 | 7.80 | 7.81 |

TABLE 7B-continued

Examples 52-58

| Grout Constituent | Ex 52 (wt %) | Ex 53 (wt %) | Ex 54 (wt %) | Ex 55 (wt %) | Ex 56 (wt %) | Ex 57 (wt %) | Ex 58 (wt %) |
|---|---|---|---|---|---|---|---|
| 2024A Source: Potters Inc. | | | | | | | |
| Cross-linking agent: Tris Aziridine Source: Chemtura Corp. | 0.19 | 0.20 | 0.20 | 0.14 | 0.14 | 0.14 | 0.14 |
| Accelerator | * * * | MgO-0.033 | ZnO-0.066 | * * * | MgO-0.033 | ZnO-0.066 | * * * |
| Silicone Emulsion: Silres 1001A Source: Wacker Chemical | 1.17 | 1.17 | 1.17 | 0.83 | 0.83 | 0.83 | 0.83 |
| Anti-microbial: Rocima 63 Source: Rohm & Haas | 0.06 | 0.06 | 0.06 | 0.04 | 0.04 | 0.04 | 0.04 |
| 12 Hour compressive strength (PSI) | 168 | 654 | 112 | 186 | 290 | 280 | 344 |
| 24 Hour compressive strength (PSI) | 244 | 954 | 244 | 412 | 570 | 448 | 891 |

Examples 52-54 are directed to binder-rich grouts with Examples 53 and 54 including MgO and ZnO accelerators respectively. The MgO-containing grout of Example 53 exhibited a 74% increase in compressive strength versus the control. The compressive strength data of Example 54 indicate that ZnO accelerator may be more effective in grout formulations including relatively less binder.

Examples 55-57 are based on plural-component binder systems comprising equal weight percentages of Alberdingk Boley U915 and AS-2685 styrene acrylic. The data show that MgO and ZnO accelerator components have measurable effects on the rate of grout curing.

Examples 58-60 in Tables 7B-7C are directed to grouts with a plural component binder system including equal parts of Alberdingk Boley U915 and UC-84 acrylic co-polymer. The grouts containing MgO and ZnO accelerator each had compressive strengths which were greater than the control grout of Example 58.

TABLE 7C

Examples 59-64

| Grout Constituent | Ex 59 (wt %) | Ex 60 (wt %) | Ex 61 (wt %) | Ex 62 (wt %) | Ex 63 (wt %) | Ex 64 (wt %) |
|---|---|---|---|---|---|---|
| Binder 1: Alberdingk Boley U915 | 7.92 | 7.915 | 7.925 | 7.92 | 11.09 | 11.08 |
| Binder 2 | 7.92 ACOP | 7.915 ACOP | 7.925 ECOP | 7.92 ECOP | 4.75 CUR21 | 4.74 CUR21 |
| Filler: Quartz Particles Source: 3M Color Quartz | 75.30 | 75.39 | 75.47 | 75.30 | 75.47 | 75.30 |
| Filler: Glass Beads Spheriglass 2024A Source: Potters Inc. | 7.80 | 7.80 | 7.81 | 7.80 | 7.81 | 7.80 |
| Cross-linking agent: Tris Aziridine Source: Chemtura Corp. | 0.14 | 0.14 | 0.14 | 0.14 | 0.14 | 0.14 |
| Accelerator | MgO-0.033 | ZnO-0.066 | * * * | MgO-0.033 | * * * | MgO-0.033 |

TABLE 7C-continued

Examples 59-64

| Grout Constituent | Ex 59 (wt %) | Ex 60 (wt %) | Ex 61 (wt %) | Ex 62 (wt %) | Ex 63 (wt %) | Ex 64 (wt %) |
|---|---|---|---|---|---|---|
| Silicone Emulsion: Silres 1001A Source: Wacker Chemical | 0.83 | 0.83 | 0.83 | 0.83 | 0.83 | 0.83 |
| Antimicrobial agent: Rocima 63 Source: Rohm & Haas | 0.04 | 0.04 | 0.04 | 0.04 | 0.04 | 0.04 |
| 12 Hour compressive strength (PSI) | 1272 | 393 | 860 | 1420 | 150 | 158 |
| 24 Hour compressive strength (PSI) | 2170 | 1038 | 1684 | 2562 | 244 | 280 |

Examples 61-62 of Table 7C are grouts with a plural-component binder consisting of equal weight percentages of Alberdingk Boley U915 and M2958, an epoxy-modified acrylic. The grout of Example 62 had a compressive strength which was 34% greater than the unmodified grout control of Example 61.

Examples 63-64 illustrate grouts with a plural-component binders comprising a 70/30% blend of Alberdink Boley U915 and CUR-21. CUR-21 is a castor-oil based polyurethane. The grout of Example 64 has improved compressive strength versus the control. The modulated increase in compressive strength is likely the result of the CUR-21 which has a relatively high elongation (800% elongation before break compared to 200% elongation before bread break of U915) and is a relatively flexible polyurethane.

Examples 65-72

Translucent Grouts

In Examples 65-72, grout compositions were prepared to evaluate glass beads as a grout filler. The glass beads were provided as the only filler material in the examples. The grout compositions were translucent because light was able to pass through the grout. The translucent grout would be ideal for use with glass and mosaic tiles because the tile color is observed through the grout providing a grout appearance in which the grout appears to complement, or "blend in with," the tile material.

A base grout formulation was prepared for each of Examples 65-72. Table 8 lists the constituents used in preparing the base grout formulation. Each grout differed only in that the particle size of the glass bead filler varied from 850 μm in Example 65 to 45 μm in Example 72 as listed in Table 9. (As is known, glass bead size is indicative of the size of the predominant fraction of beads in the sample.)

TABLE 8

Examples 65-72 Base Grout Formulation Constituents

| No. | Constituent | Amount (lbs.) | Amount (wt. %) |
|---|---|---|---|
| 1 | PUD Binder: Source: Alberdingk Boley U915 | 1.7 | 17.77 |
| 2 | Filler: Glass Beads Spheriglass D | 7.20 | 75.0 |

TABLE 8-continued

Examples 65-72 Base Grout Formulation Constituents

| No. | Constituent | Amount (lbs.) | Amount (wt. %) |
|---|---|---|---|
|  | Particle size range 45 to 850 μm Source: Potters, Inc. |  |  |
| 3 | Silicone Emulsion: Silres 1001A Source: Wacker Chemical | 0.75 | 0.78 |
| 4 | Cross-linking Agent Tri-aziridine Witcolink AZ 28 Source: Bayer Material Science Corp. | 0.012 | 0.125 |
| 5 | Antimicrobial agent: Rocima 63 Source: Rohm & Haas | 0.004 | 0.042 |
| 6 | Tint: CW series tint Source: Elementis Specialties | 0.005 | 0.052 |
|  | Total | 9.67 | 100% |

The following evaluation was conducted to qualitatively evaluate effect of glass bead particle size on the grout. A substrate was first prepared comprising clear glass tiles (4×4× 0.25 inches) with a 0.250 inch joint between tiles. The tiles were set onto a backer board using white premixed thin set and allowed to dry for 15 hours. Once dry, a black permanent marker was used to mark on the white thin set between the tiles to assist in visualizing grout light-transmissivity.

After 15 minutes each joint was grouted with one of the exemplary grouts using an epoxy rubber float. A control composition with a preferred glass bead particle size range of about 210-297 μm (about 50-70 mesh) was used as a baseline. Ease of grout application was subjectively determined during the grouting with results as indicated in Table 9.

Grout was allowed to cure at between 68° F. to about 73° F. for 72 hours. Visual observations were made to indicate the visibility of the cross at the bottom of the joint as seen through the grout and compared to the control observations are recorded in Table 9.

TABLE 9

Examples 65-72 - Glass Bead Particle Size

| Example | Particle Size (μm) | Workability | Translucency |
|---|---|---|---|
| 65 | 850 | 1 | 5 |
| 66 | 600 | 2 | 5 |

TABLE 9-continued

Examples 65-72 - Glass Bead Particle Size

| Example | Particle Size (μm) | Workability | Translucency |
|---|---|---|---|
| 67 | 452 | 2 | 4.5 |
| 68 | 300 | 3 | 4 |
| 69 | 250 | 4 | 3.5 |
| 70 | 212 | 4 | 2.5 |
| 71 | 75 | 5 | 1.5 |
| 72 | 45 | 5 | 1 |

The data of Table 9 reports workability and translucency of each grout composition with 1 indicating less workability/translucency and 5 indicating more workability/translucency. The data of Table 9 show that there is a relationship between glass bead particle size and workability (i.e., ability to work into a space, such as a tile joint) and light transmissivity. Grout formulations with larger particle size diameter glass bead filler tend to have increased levels of light-transmissivity but decreased workability.

The data show that grout compositions may be formulated to meet a wide range of user needs based on the user's needs for workability and light transmissivity. A wide range of glass bead particle sizes may be used to accomplish this objective. Glass bead sizes of about 75 μm to about 300 μm would have excellent workability and light-transmissivity properties.

Examples 73-77

Grouts Including Cross-Linking Constituent

In Examples 73-77, grout compositions were prepared to evaluate improvements provided by a cross-linking constituent. From 1 to 5 grams of tris aziridine were added to a grout composition having the constituents listed in Table 10.

TABLE 10

Examples 73-77 Base Formulation

| No. | Constituent | Amount (lbs.) | Amount (wt. %) |
|---|---|---|---|
| 1 | PUD Binder: Source: Alberdingk Boley U915 (Includes 0.20 wt. % UCAR thickener from The Dow Chemical Company) | 3.0 lbs | 16.6% |
| 2 | Filler: Quartz Particles Mushroom colored quartz Source: Estes-Permacolor BC-fine | 14 lbs | 77.4% |
| 3 | Filler: Glass Flour Sil-co-Sil 125 Source: U.S. Silica | .906 lbs | 5.0% |
| 4 | Silicone Emulsion: Silres 1001A Source: Wacker Chemical | .15 lbs | 0.82% |
| 5 | Cross-linking Agent: Tris aziridine Witcolink AZ 28 Source: Bayer Material Science Corp. | Varied: From 0.01 to 0.050 lbs. per Table 11 | Varied: About 1 to 5% of PUD solids |
| 6 | Accelerator: Magchem 200 AD Source: Martin Marietta | 0.033 | 0.00033 |
| 7 | Antimicrobial agent: Rocima 63 Source: Rohm & Haas | .006 lbs | 0.04% |
|   | Total | 18.08 to 18.12 lbs | 100% |

Grout flexibility, water absorption, hardness, and stain resistance tests were performed and time to surface hardness (TSH) noted. The results are reported in Table 11. Generally, increased flexibility and hardness with reduced water absorption are considered desirable in a grout.

TABLE 11

Selected Properties of Aziridine-Containing Grouts

| Ex. | Aziridine (lbs.) | Flexibility | Water Absorption % | Hardness % | Stain Resistance % |
|---|---|---|---|---|---|
| 73 | 0.01 | 17.5 | 9.5 | 22.0 | 15.0 |
| 74 | 0.02 | 19.7 | 10.6 | 23.8 | 18.1 |
| 75 | 0.03 | 26.2 | 10.8 | 23.9 | 24.9 |
| 76 | 0.04 | 33.5 | 10.7 | 23.9 | 25.8 |
| 77 | 0.05 | 33.7 | 10.7 | 24.0 | 25.9 |

Grout flexibility was determined using a three-point deflection test. For each of Examples 73-77, six total grout samples were prepared according to the base formulation of Table 10. Three of the samples were controls with no tris aziridine. The other three samples each included from 0.01 to 0.05 pounds of tris aziridine as indicated in Table 11.

For each of Examples 73-77, each of the six grout samples was worked into three 4.75 inch×0.375 inch×0.25 inch deep polypropylene channels. Each grout was allowed to cure for 30 days at room temperatures of about 68 to about 73° F.

After curing, each grout sample was removed from the polypropylene channel and placed in a hydraulic press between two supports. A 0.165 diameter steel pin applied force to the cured grout between the supports at a rate of 0.5 lbs per second and deflection was measured at 0.5 lbs, 1 lbs, 2 lbs, and 5 lbs force, if the grout did not crack. Deflection was measured by the amount of force required to bend the channel 0.0625 inch in the center without cracking the grout in the channel. Deflection of the three experimental specimens including aziridine and the three control samples were averaged. The average deflection difference between the control and modified grouts is reported in the table. In general, it is desirable for a grout to have more flexibility without cracking to accommodate movement of the substrate to which the grout is applied.

As reflected in Table 11, grout compositions including tris aziridine had improved flexibility versus the control samples. Table 11 also illustrates that grout flexibility is improved as the amount of tris aziridine is increased.

Water absorption was measured by determining change in grout mass after exposure to water. Less water absorption is considered desirable. Five experimental and control grout samples (six total samples) were prepared according to the base formulation in Table 10 with the experimental samples including the tris aziridine amounts provided in Table 11. Each control and experimental grout was worked into a 2.75 inch diameter petri dish. The grouts were allowed to cure for 7 days at temperatures of about 68 to about 73° F. Following cure, each grout sample, including the petri dish and petri dish lid was weighed and the mass recorded.

Three grams of water at about 70° F. were applied to the center of each grout sample. Each grout sample was then sealed by placement of the lid on the petri dish. Each sample was then allowed to dry for 15 hours at a room temperature of about 68 to about 73° F. After 15 hours, excess water was wiped from the surface of sample. The samples were weighed again and the mass again recorded.

The samples including tris aziridine absorbed from 9.5 to 10.7% less water than the control samples which did not include tris aziridine indicating that tris aziridine is effective at preventing water absorption. The results are provided in Table 11.

To measure grout hardness, five experimental samples and one control grout sample were again prepared according to the base formulation in Table 11 with the experimental samples including the tris aziridine amounts provided in Table 11. The control and experimental grouts were worked into a 2.75 inch diameter petri dish. The grouts were allowed to cure for 30 days at room temperatures of about 68 to about 73° F.

Grout hardness was determined by scoring each grout sample 25 times with a 5 lbs pointed scoring tool to remove portions of the grout surface. Each grout sample was weighed prior to and after scoring with the change in grout mass being a measure of grout hardness. Increased grout hardness is considered to be desirable. The data reported in Table 11 indicate that grout including tris aziridine ranged from 22 to 24% harder than control grout compositions not including tris aziridine.

Stain resistance and dry time in Table 11 were evaluated in the following manner. Grout samples were made by smoothing grout into separate 2.75 inch diameter petri dishes. Three grout samples were prepared for each amount of tris aziridine shown in Table 11. Following a 7 day cure time at temperatures between 68-73° F., samples were soiled with Starbucks black coffee, spaghetti sauce and mustard for about 1 hour. The grout samples were first cleaned using only water and a clean cloth. Visual comparisons were qualitatively made between the control and experimental compositions as to the approximate percentage stain removed.

A second cleaning using a tooth brush and Formula 409® cleaner was performed. A second visual observation was then made between the amount of stain remaining on the experimental and control compositions. This process was repeated for all 5 samples and the average of the percentage improvement recorded in Table 11.

Examples 78-82

Grouts Including Silicone Emulsions

In Examples 78-82, grout compositions were prepared to evaluate improvements provided by a silicone-containing emulsion. The base formulation for the grout was the same as that in Table 11 except that tris aziridine was provided in an amount of 2% by weight of the grout component (0.02 pounds) and the weight percentage of the silicone-containing emulsion was varied. Silres® BS 1001A silicone water repellant from Wacker Chemical Corporation was the exemplary silicone emulsion selected for Examples 78-82. The amount of Silres ranged from about 1 to about 5 percent by weight of the grout component in the five examples.

Grout samples were prepared as in Examples 73-77 and were smoothed into separate 2.75 inch diameter petri dishes. Three samples of each Silres-containing grout and 3 controls with no Silres 1001A were prepared (total 18 samples).

Following a seven day cure time at temperatures between 68-73° F., each sample was soiled with Starbucks brand black coffee, spaghetti sauce and mustard for approximately one hour.

Thereafter, the control and exemplary grouts were cleaned using only water and a clean cloth. Visual comparisons were made between the control and exemplary grouts to qualitatively determine the amount of contaminant remaining. A second cleaning using a tooth brush and Formula 409® cleaner was performed and a second visual observation was made as compared to the control. This process was repeated for all 3 samples and the average of the percentage improvement recorded in Table 12.

Absorbency testing was performed by recording the pre-weights of the test samples and then placing 3-4 grams of water in the center of the cured sample. A cover was placed over the petri dish for 15 hours (i.e., overnight). Any excess water was wiped away and samples were weighed again. The average weight was recorded and compared to the average control weight. The average percent improvement was recorded in Table 12.

TABLE 12

Grout Containing Silicone Emulsion - Stain Resistance

| Ex. | Silres 1001A Addition (wt %) | Absorbency | Stain Resistance |
|---|---|---|---|
| 78 | 1 | 3.4 | 31 |
| 79 | 2 | 2.9 | 39.8 |
| 80 | 3 | 2.7 | 39.9 |
| 81 | 4 | 2.8 | 39.9 |
| 82 | 5 | 2.8 | 40.1 |

The data show that silicone-containing emulsion is a useful constituent for inclusion in a grout. Inclusion of silicone-containing emulsion decreases grout water absorbency and makes the grout easier to clean, providing improvement in grout stain resistance.

While the principles of this invention have been described in connection with specific embodiments and examples, it should be understood clearly that these descriptions are made only by way of example and are not intended to limit the scope of the invention.

The invention claimed is:
1. Grout comprising:
   a grout component comprising:
      about 13 to about 25 percent by weight water-borne polyurethane; and
      about 75 to about 87 percent by weight filler; and
   an accelerator component in an amount sufficient to provide an accelerator component surface area of about 1 to about 60 square meters per 100 grams of the grout component, said accelerator component being selected from the group consisting of magnesium hydroxide, magnesium oxide, zinc oxide and any combination thereof.
2. The grout of claim 1 wherein the accelerator component is magnesium oxide.
3. The grout of claim 1 wherein the accelerator component is magnesium hydroxide.
4. The grout of claim 1 wherein the accelerator component is zinc oxide.
5. The grout of claim 1 wherein the accelerator component has a surface area of about 10 to about 200 square meters per gram.
6. The grout of claim 1 wherein the accelerator component and the grout component are separate components which are admixed prior to grout application.
7. The grout of claim 1 comprising about 14 to about 18 percent by weight water-borne polyurethane.
8. The grout of claim 1 wherein the water-borne polyurethane has a soft segment selected from the group consisting of polyester, polycarbonate, castor oil, castor oil acrylic hybrid, acrylic polyester, acrylic polyester polycarbonate and any combination thereof.

9. The grout of claim 1 wherein the water-borne polyurethane comprises about 20 to about 70 percent by weight polyurethane solids.

10. The grout of claim 9 wherein the water-borne polyurethane comprises about 33 to about 70 percent by weight polyurethane solids.

11. The grout of claim 1 wherein the grout component further comprises a binder selected from the group consisting of water-borne acrylic styrene polymer, co-polymer of polycarbonate and methyl-methacrylate, modified epoxy acrylic, castor-oil-based polyurethane and any combination thereof.

12. The grout of claim 1 wherein the filler has a particle size range of about 5 μm to about 850 μm.

13. The grout of claim 1 wherein the filler is selected from the group consisting of quartz, silica flour, glass beads, acrylic beads, polypropylene beads, polyethylene beads, urethane beads, polystyrene beads, polycarbonate beads and any combination thereof.

14. The grout of claim 1 wherein the filler is light-transmissive.

15. The grout of claim 1 wherein the water-borne polyurethane has a solids content and the grout component further comprises a polyurethane cross-linking agent in an amount of about 0.5 to about 10 percent by weight based on the water-borne polyurethane solids content.

16. The grout of claim 15 wherein polyurethane cross-linking agent is selected from the group consisting of tris aziridine, carbodiimide-based materials, water dispersible isocyanates and any combination thereof.

17. The grout of claim 1 wherein the grout component further comprises about 0.7 to about 0.8 percent by weight of a silicone-containing emulsion.

18. The grout of claim 1 wherein the grout component further comprises an antimicrobial agent.

19. The grout of claim 1 further comprising a latex thickener.

20. A grout comprising: a grout component including about 13 to about 25 percent by weight aqueous aliphatic anionic polyurethane dispersion; and about 75 to about 87 percent by weight filler; and an accelerator component for admixture with the grout component, said accelerator component being selected from the group consisting of magnesium hydroxide, magnesium oxide, zinc oxide and any combination thereof and being provided in an amount sufficient to have a total accelerator component surface area of about 1 to about 60 square meters per 100 grams of the grout component.

21. The grout of claim 20 wherein the filler is selected from the group consisting of quartz, silica flour, glass beads, acrylic beads, polypropylene beads, polyethylene beads, urethane beads, polystyrene beads, polycarbonate beads and any combination thereof.

22. The grout of claim 20 wherein the grout is light-transmissive.

23. The grout of claim 20 wherein the water-borne polyurethane dispersion has a solids content and the grout component further comprises a polyurethane cross-linking agent in an amount of about 0.5 to about 10 percent by weight based on the water-borne polyurethane dispersion solids content.

24. A light-transmissive grout for filling a joint defined by colored tiles comprising:
a light-transmissive grout including:
about 13 to about 25 percent by weight of a light-transmissive binder comprising water-borne polyurethane; and
about 75 to about 87 percent by weight light-transmissive filler admixed with the binder, said light-transmissive filler permitting passage of light through the grout so that grout in the joint has a color appearance like the color of the tiles defining the joint; and
an accelerator for admixture with the light-transmissive grout, the accelerator being selected from the group consisting of magnesium hydroxide, magnesium oxide, zinc oxide and any combination thereof and being provided in an amount sufficient to have a total accelerator surface area of about 1 to about 60 square meters per 100 grams of the light-transmissive grout.

25. The light-transmissive grout of claim 24 wherein the light-transmissive filler is selected from the group consisting of glass beads, acrylic beads, polypropylene beads, polyethylene beads, polystyrene beads, urethane beads, polycarbonate beads and any combination thereof.

26. The light-transmissive grout of claim 25 wherein the light-transmissive filler comprises glass beads.

27. The light-transmissive grout of claim 26 wherein the glass beads have a particle size diameter in the range of about 45 μm to about 850 μm.

28. The light-transmissive grout of claim 27 wherein the glass beads comprise generally spherical glass beads.

29. The light-transmissive grout of claim 27 wherein the glass beads are solid.

30. The light-transmissive grout of claim 24 wherein the light-transmissive filler comprises a further filler selected from the group consisting of silica flour, quartz particles and any combination thereof.

31. The light-transmissive grout of claim 24 wherein the water-borne polyurethane has a soft segment selected from the group consisting of polyester, polycarbonate, castor oil, castor oil acrylic hybrid, acrylic polyester, acrylic polyester polycarbonate and any combination thereof.

32. The light-transmissive grout of claim 24 further comprising a binder selected from the group consisting of water-borne acrylic styrene polymer, co-polymer of polycarbonate and methyl-methacrylate, modified epoxy acrylic, castor-oil-based polyurethane and any combination thereof.

33. The light-transmissive grout of claim 24 further comprising about 0.002 to about 0.2% by weight of the water-borne polyurethane of a pigment.

\* \* \* \* \*